(12) United States Patent
Bäck et al.

(10) Patent No.: US 12,113,426 B2
(45) Date of Patent: Oct. 8, 2024

(54) ROTOR SHAFT ASSEMBLY, METHOD FOR MANUFACTURING OF ROTOR SHAFT ASSEMBLY AND DEVICES COMPRISING ROTOR SHAFT ASSEMBLY

(71) Applicant: Mirka Ltd, Jepua (FI)

(72) Inventors: Simon Bäck, Vörå (FI); Tobias Holmqvist, Korsholm (FI); Tomas Södergård, Nykarleby (FI)

(73) Assignee: Mirka Ltd, Jepua (FI)

( * ) Notice: Subject to any disclaimer, the term of this patent is extended or adjusted under 35 U.S.C. 154(b) by 0 days.

(21) Appl. No.: 18/560,028

(22) PCT Filed: May 11, 2022

(86) PCT No.: PCT/FI2022/050317
§ 371 (c)(1),
(2) Date: Nov. 9, 2023

(87) PCT Pub. No.: WO2022/238623
PCT Pub. Date: Nov. 17, 2022

(65) Prior Publication Data
US 2024/0235320 A1    Jul. 11, 2024

(30) Foreign Application Priority Data
May 14, 2021 (FI) ..................... 20215573

(51) Int. Cl.
*H02K 7/00* (2006.01)
*H02K 7/14* (2006.01)
*H02K 9/06* (2006.01)

(52) U.S. Cl.
CPC ............. *H02K 7/003* (2013.01); *H02K 7/145* (2013.01); *H02K 9/06* (2013.01)

(58) Field of Classification Search
CPC ........... H02K 7/003; H02K 7/145; H02K 9/06
(Continued)

(56) References Cited

U.S. PATENT DOCUMENTS 3,109,238 A   11/1963  Marks
3,622,821 A   11/1971  Maffey, Jr.
(Continued)

FOREIGN PATENT DOCUMENTS

EP   3739730 A1   11/2020
FR   2588428 A1    4/1987
(Continued)

OTHER PUBLICATIONS

International Search Report in PCT/FI2022/050317, mailed Sep. 2, 2022, 3 pages.
(Continued)

*Primary Examiner* — Terrance L Kenerly
(74) *Attorney, Agent, or Firm* — ArentFox Schiff LLP

(57) ABSTRACT

There is provided a solution for electrical insulation for an output shaft, tool and/or accessory driven by an electric motor, and the presence of the electrical insulation is also easy to verify. A rotor shaft assembly for an electric motor includes at least one section that is configured to extend in an axial direction of the rotor shaft assembly outside of a stator assembly of the electric motor, when the rotor shaft assembly is rotatably mounted inside the stator assembly. An electrical insulator is connected to the at least one section and the electrical insulator is configured to connect to an output shaft for connecting with a tool and/or accessory, or configured to connect directly to a tool and/or accessory to be driven by the electric motor.

16 Claims, 32 Drawing Sheets

(58) Field of Classification Search
USPC .......................................................... 310/50
See application file for complete search history.

(56) References Cited

U.S. PATENT DOCUMENTS

| | | | |
|---|---|---|---|
| 5,215,503 | A | 6/1993 | Krouse et al. |
| 5,672,365 | A | 9/1997 | Ishii et al. |
| 11,005,323 | B2 | 5/2021 | Segawa et al. |
| 2014/0292120 | A1* | 10/2014 | Kalev .................... H02K 7/025 |
| | | | 310/74 |
| 2015/0003900 | A1 | 1/2015 | Ullrich et al. |
| 2017/0012504 | A1* | 1/2017 | Sever ..................... H02K 15/14 |
| 2017/0257008 | A1* | 9/2017 | Doerksen ................. H02K 5/02 |
| 2017/0373569 | A1 | 12/2017 | Fung et al. |

FOREIGN PATENT DOCUMENTS

| | | |
|---|---|---|
| SE | 393008 B | 4/1977 |
| WO | 2015060772 A1 | 4/2015 |
| WO | 2016177394 A1 | 11/2016 |

OTHER PUBLICATIONS

Written Opinion in PCT/FI2022/050317, mailed Sep. 2, 2022, 5 pages.
Office action dated May 14, 2024 for corresponding Finnish Patent Application No. 20215573, Finnish Patent and Registration Office, 9 pages.

* cited by examiner 2902 shaping a billet part for a rotor axis to comprise at least one section configured to extend in an axial direction of the rotor shaft outside of a stator assembly of the electric motor, when the rotor shaft is rotatably mounted inside the stator assembly; and

2904 connecting an electrical insulator to the at least one section, wherein the electrical insulator is configured to connect to an output shaft for connecting with a tool and/or accessory, or configured to connect directly to a tool and/or accessory to be driven by the electric motor.

Fig. 33

ROTOR SHAFT ASSEMBLY, METHOD FOR MANUFACTURING OF ROTOR SHAFT ASSEMBLY AND DEVICES COMPRISING ROTOR SHAFT ASSEMBLY

CROSS-REFERENCE TO RELATED APPLICATIONS

This application is a National Phase of PCT/FI2022/050317, filed on May 11, 2022, which claims priority to Finnish Patent Application No. 20215573, filed on May 14, 2021, the disclosures of each of which are hereby incorporated by reference in their entireties.

TECHNICAL FIELD

The present invention relates to a rotor shaft assembly for an electric motor, a method for manufacturing a rotor shaft assembly and devices comprising a rotor shaft assembly.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Handheld electrical tools should satisfy requirements of electrical safety. IEC 62841-1:2014 deals with the safety of electric motor-operated or magnetically driven handheld tools. In an electric motor-operated or magnetically driven handheld tool, the requirements of electrical safety may be satisfied by providing an insulation of 2 mm between parts in contact with each other or a distance of 8 mm through air if safety is provided solely by insulation (double insulation/class 2 construction). Also grounding of conductive parts may be used to provide electrical safety. Ensuring sufficient distance requires careful design of the electric motor and the handheld tool. However, verification compliance of a handheld tool to meet the safety requirements may be challenging if the number of electrical insulators is many and with variable dimensions of the electrical insulators. Even with careful design of the electric motor and the handheld tool, electrical safety of the electric motor and the handheld tool may be compromised by wear.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which:

FIG. 33 illustrates an example of a method in accordance with at least some embodiments.

DETAILED DESCRIPTION OF SOME EXAMPLE EMBODIMENTS

Figure 1:
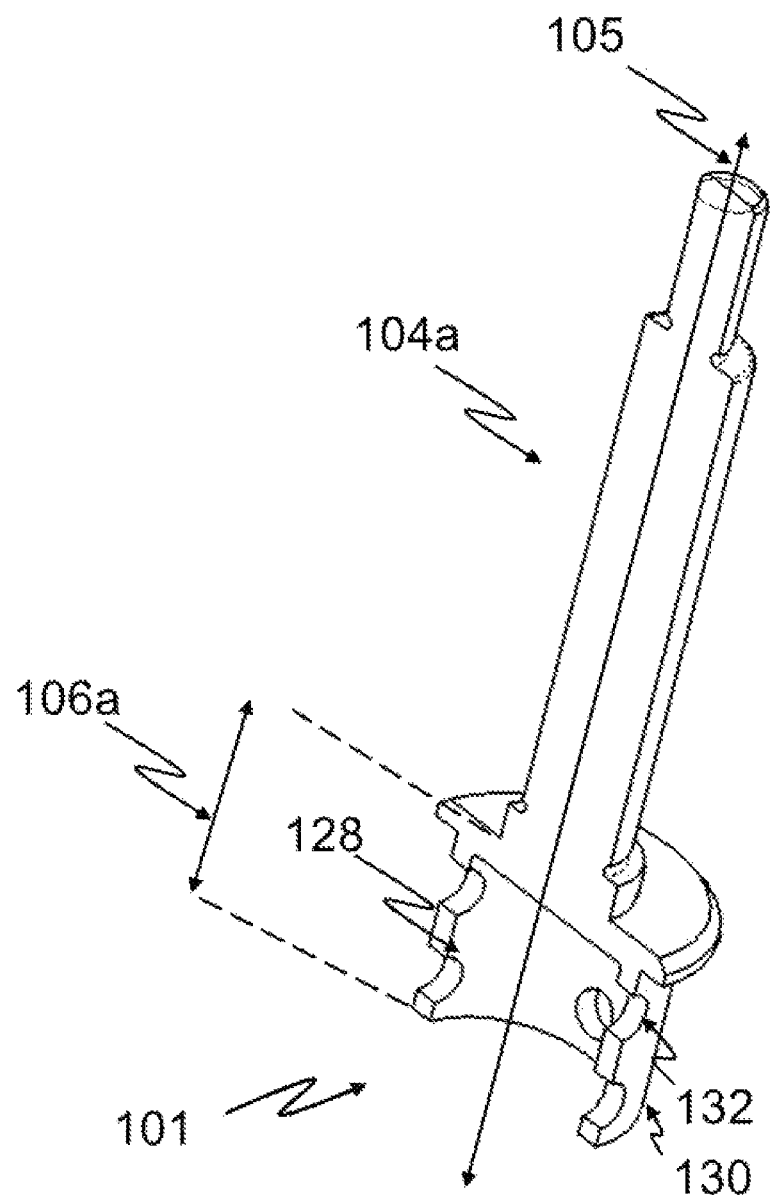
FIGS. 1 to 4 illustrate an example of a part of a rotor shaft assembly in accordance with at least some embodiments.
Figure 2:
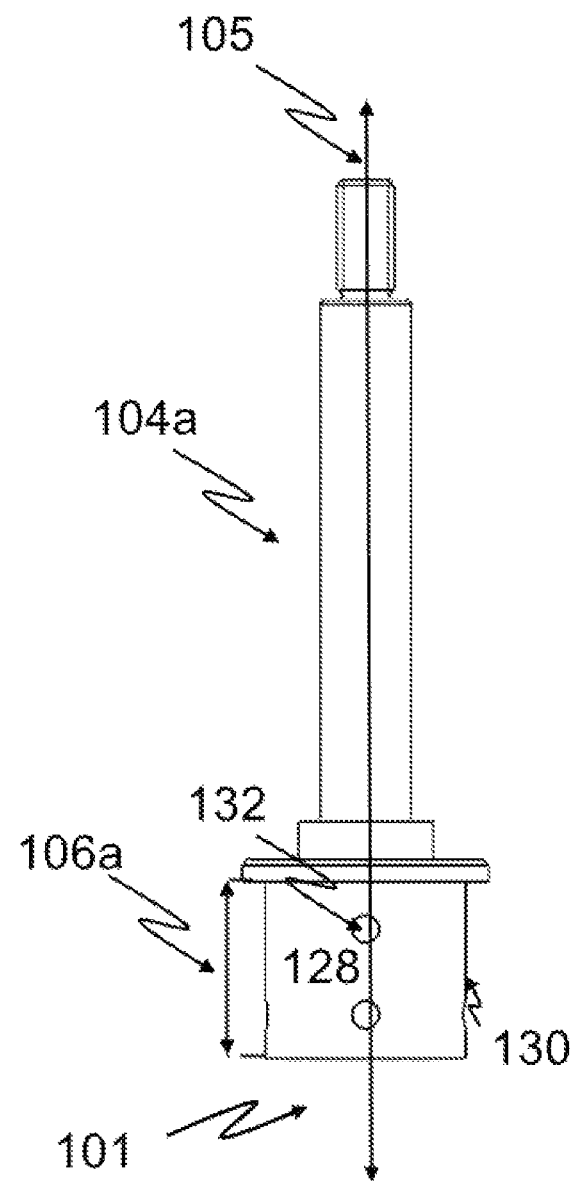
Figure 3:
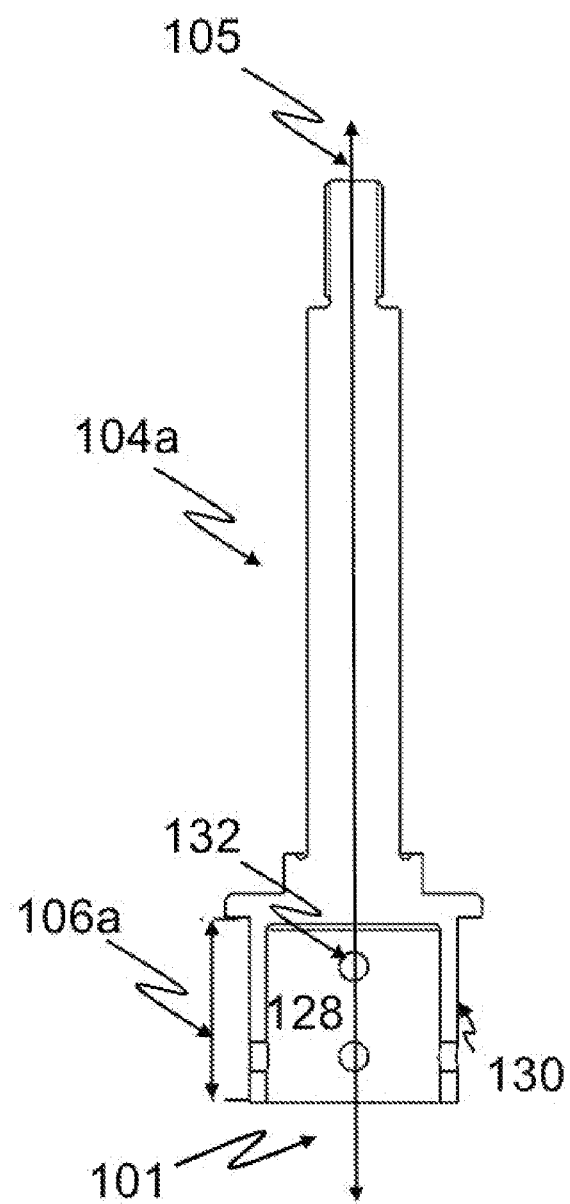
Figure 4:
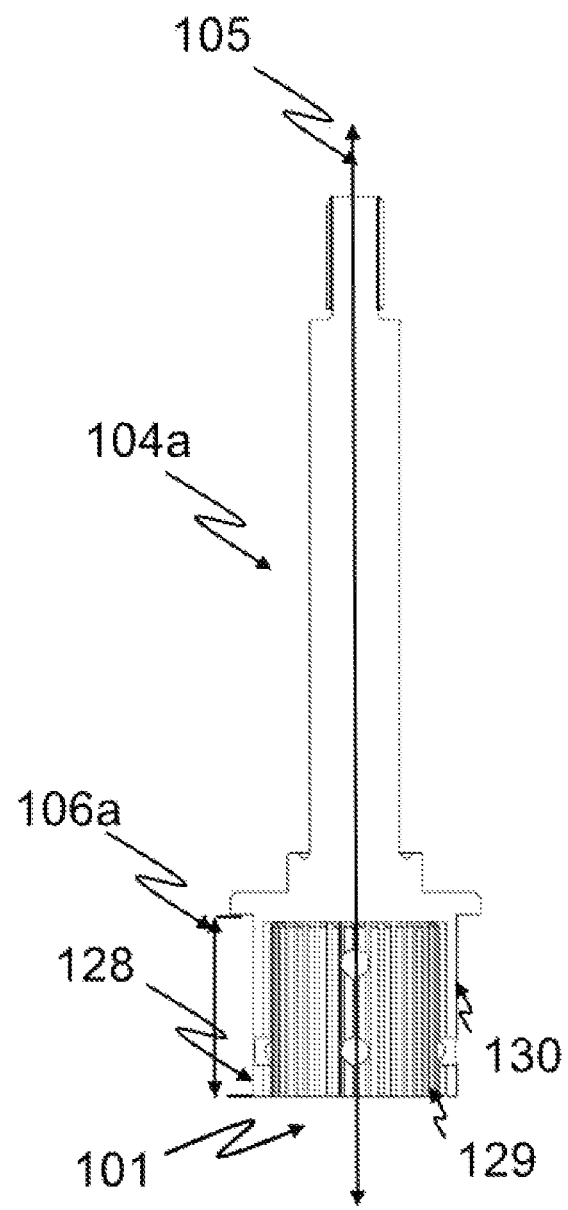

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Identical or corresponding functional and structural elements which appear in the different drawings are assigned the same reference numerals. When the words first and second are used to refer to different elements, it is to be understood that this does not necessarily imply or mean that the first and second elements are somehow structurally substantially different elements or that their dimensions are substantially different unless specifically stated.

There is provided a rotor shaft assembly for an electric motor comprising at least one section that is configured to extend in an axial direction of the rotor shaft assembly outside of a stator assembly of the electric motor, when the rotor shaft assembly is rotatably mounted inside the stator assembly, and an electrical insulator connected to the at least one section and the electrical insulator is configured to connect to an output shaft for connecting with a tool and/or accessory, or configured to connect directly to a tool and/or accessory to be driven by the electric motor. The electrical insulator provides transferring torque from the electric motor to a device, e.g. an output shaft, tool and/or accessory, connected to the rotor shaft assembly, and electrically insulating the connected device from the electric motor. In this way electrical shocks to a user touching the connected device may be avoided. Electrical insulation is an important safety feature in handheld tools that include electric motors, where users may need to touch devices, e.g. an output shaft, tool and/or accessory connected to the handheld tools. Wear and dust build-up inside a handheld tool may increase a risk of electrical malfunctioning and thereby an electrical shock to a user of the handheld tool.

Rotor shaft may refer to a longitudinal part for an electric motor. The electrical motor converts electrical energy into a rotation of the rotor shaft about its longitudinal axis. The rotation of the rotor shaft has a torque that may be used to operate devices. The rotor shaft may be connected to devices, e.g. an output shaft, a tool and/or an accessory, to be driven by the torque of the rotor shaft. Rotor shaft assembly refers to a rotor shaft constructed of two or more parts that have different characteristics for example regarding material, shape, size and function. The parts may be manufactured by separate manufacturing processes, e.g. by casting, rotary cutting, 3D-printing and/or injection molding. The parts may be connected, or assembled, together thereby forming a rotor shaft assembly, i.e. rotor shaft. Examples of the electric motor comprise an in-runner motor or an out-runner motor. The electric motor may be installed to a handheld tool for operating the handheld tool. The handheld tool may be a polisher, a sander, a grinder, a screwdriver, an impact driver, a drill, a circular saw, a chain saw or a jack hammer.

Output shaft may be a part of a rotor shaft assembly for output of torque from an electric motor to a device. In an example, the output shaft may serve for an adapter between a rotor shaft or a part of the rotor shaft and tools and/or accessories.

Figure 5:
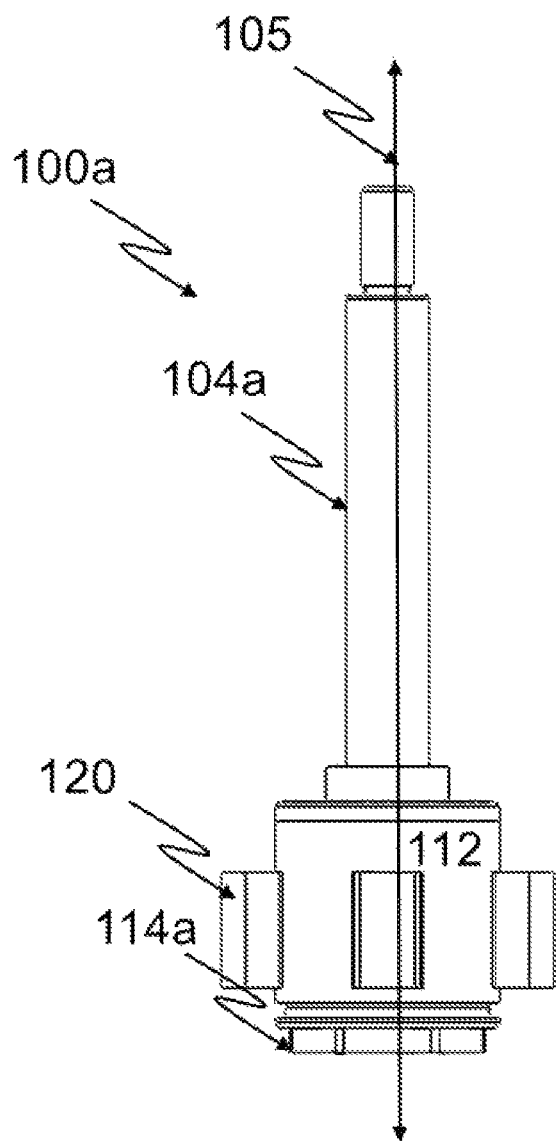
FIGS. 5 and 6 illustrate an example of a rotor shaft assembly in accordance with at least some embodiments.
Figure 6:
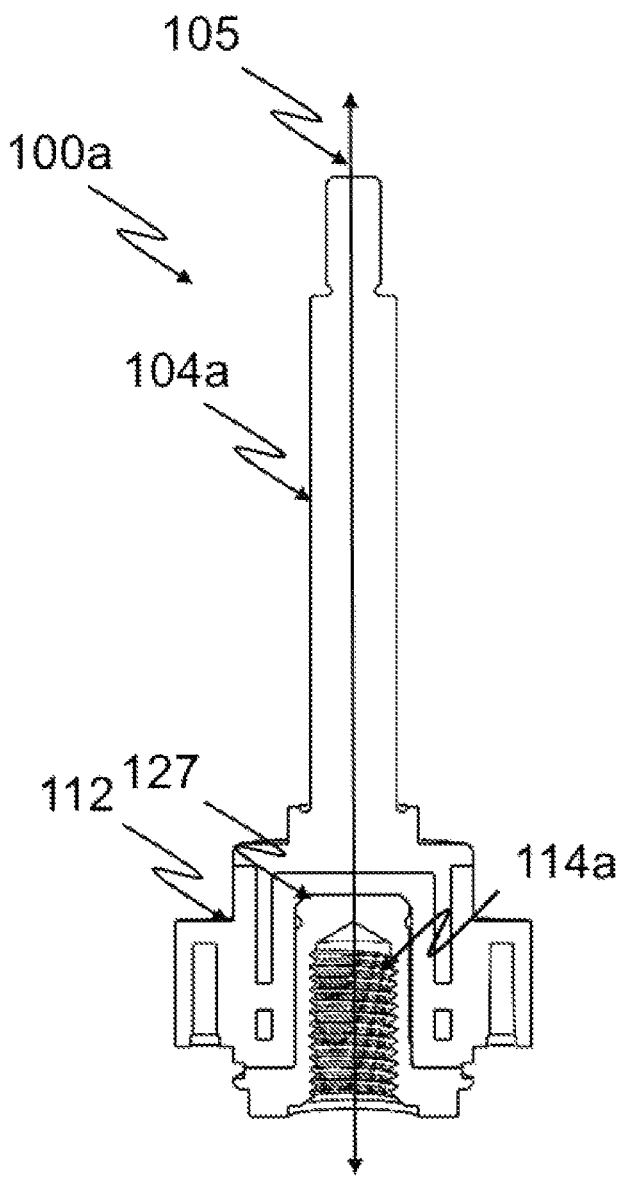
Figure 7:
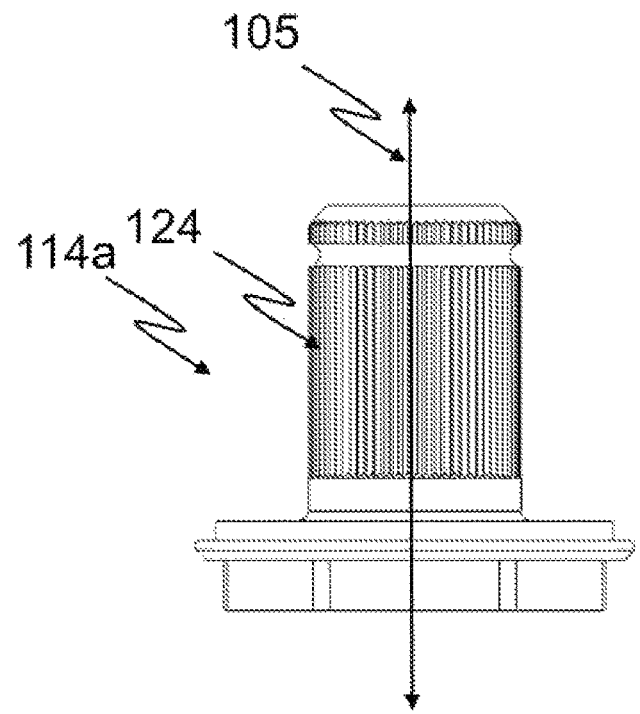
FIGS. 7 and 8 illustrate an example of output shaft in accordance with at least some embodiments.
Figure 8:
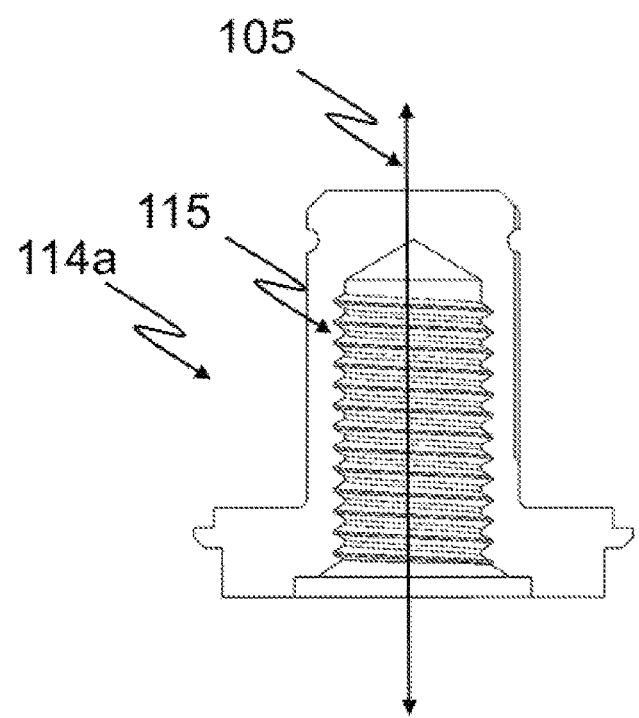
Figure 9:
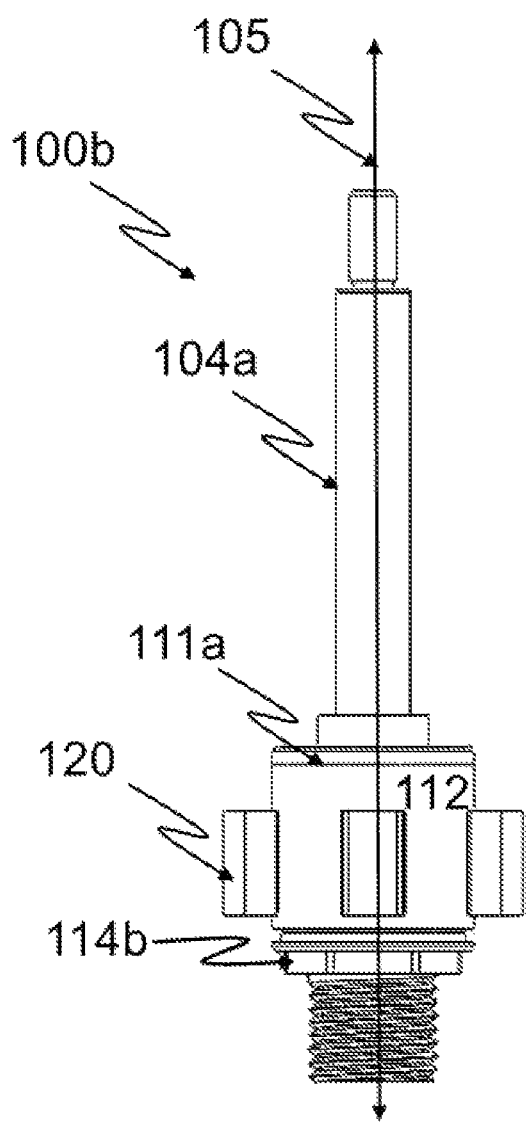
FIGS. 9 and 10 illustrate an example of a rotor shaft assembly in accordance with at least some embodiments.
Figure 10:
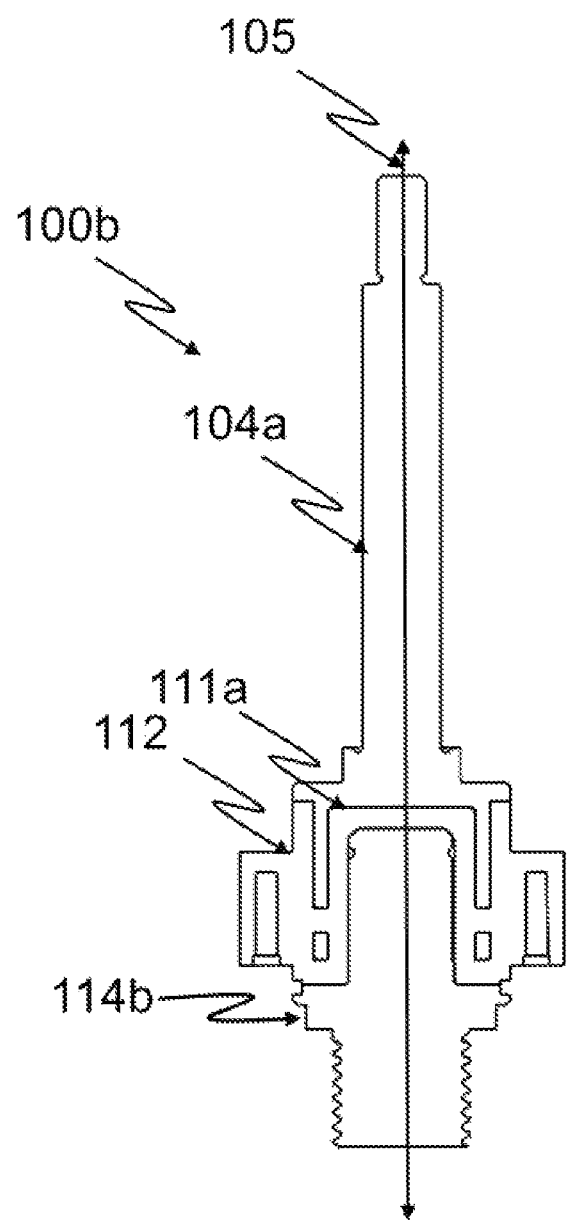
Figure 11:
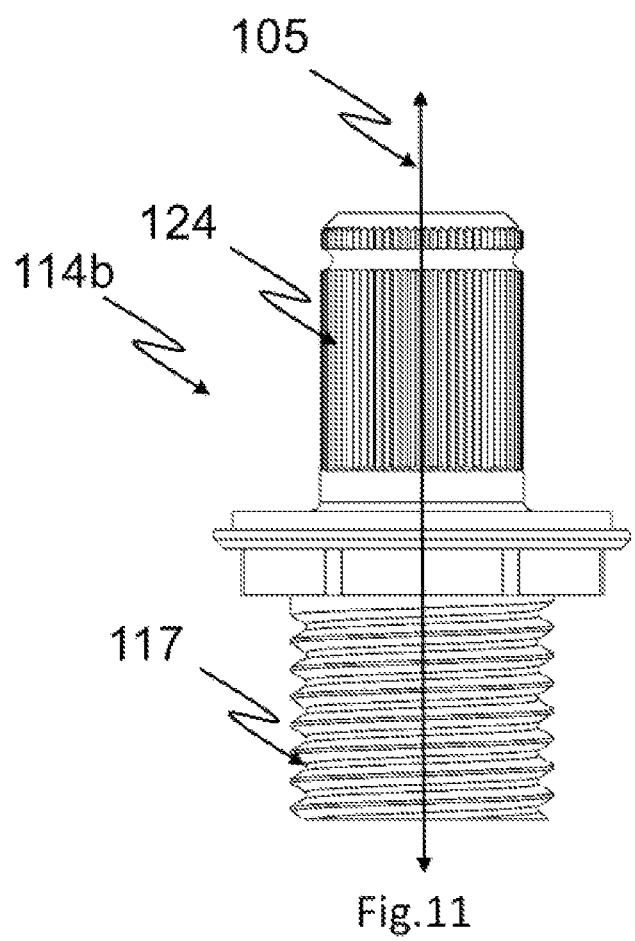
FIGS. 11 and 12 illustrate an example of output shaft in accordance with at least some embodiments.
Figure 12:
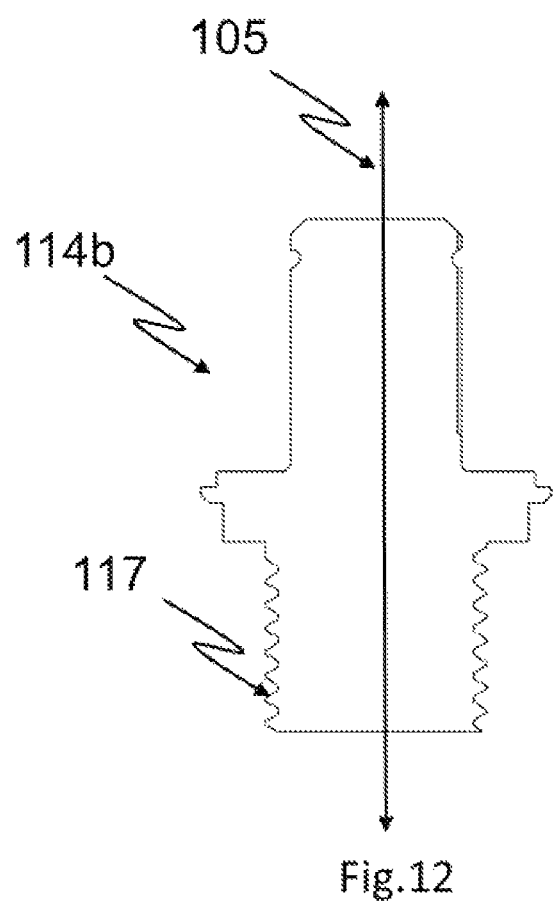

FIGS. 1-12 illustrate constructions of rotor shaft assemblies for connecting to a tool and/or accessory via an output shaft 114a, 114b. FIGS. 1 to 4 illustrate an example of a part 104a of a rotor shaft assembly in accordance with at least some embodiments. FIGS. 5 and 6 illustrates a rotor shaft assembly 100a comprising the part of FIG. 1 connected to an electrical insulator 112 and the output shaft 114a comprising an inside thread 115 for connecting with a tool and/or accessory. FIG. 6 is a cross-sectional view of the rotor shaft assembly 100a of FIG. 5 in an axial direction 105 of the rotor shaft assembly. FIGS. 7 and 8 illustrate an example of the output shaft 114a for the rotor shaft assembly described with FIGS. 5 and 6. FIG. 8 is a cross-sectional view of the output shaft 114a of FIG. 7 in an axial direction 105 of the rotor shaft assembly. FIGS. 9 and 10 illustrates a rotor shaft assembly 100b comprising the part 104a of FIG. 1 connected to the electrical insulator 112 and an output shaft 114b comprising an outside thread 117 for connecting with a tool and/or accessory. FIG. 10 is a cross-sectional view of the rotor shaft assembly 100b of FIG. 9 in an axial direction 105 of the rotor shaft assembly. FIGS. 11 and 12 illustrate an example of an output shaft 114b for the rotor shaft assembly 100b described with FIGS. 9 and 10. FIG. 12 is a cross-sectional view of the output shaft of FIG. 11 in an axial direction 105 of the rotor shaft assembly.

Referring to FIGS. 1-12, the constructions of the rotor shaft assemblies 100a, 100b are illustrated in the axial direction 105, or parallel to a vertical direction, of the rotor shaft assembly. In this position, an end 101 of the rotor shaft assembly that is towards a tool or accessory driven by the rotor shaft assembly, when the rotor shaft is installed to an electric motor, is at the bottom. The part 104a of the rotor shaft assembly is configured to be rotatably mounted inside a stator assembly of an electric motor and to extend out of the stator assembly in an axial direction 105 of the rotor shaft assembly. Accordingly, the part 104a may be a longitudinal piece of material, e.g. ferromagnetic material such as iron alloy, formed e.g. by rotary cutting. In an example the part 104a may comprise mounting positions for bearing assemblies that may be used for mounting the part 104a to the stator assembly.

The rotor shaft assembly may comprise at least one section 106a that is configured to extend in the axial direction 105, or in a direction that is parallel to the axial direction, of the rotor shaft assembly 100a, 100b outside of a stator assembly of the electric motor, when the rotor shaft assembly is rotatably mounted inside the stator assembly. In an example, the length of the section 106a may be sufficient such that the section extends out of the stator assembly, whereby the end 101 may be connected to an electric insulator 112 outside of the stator assembly. The electric insulator may have at least one first portion 111a for connecting with the at least one section 106a and at last one second portion configured to connect with the output shaft 114a, 114b.

The rotor shaft assembly 100a, 100b comprises an electrical insulator 112 connected to the at least one section 106a and the electrical insulator is configured to connect with an output shaft 114a,114b for connecting with a tool and/or accessory. In this way, the electrical insulator may provide electrical insulation to the output shaft, tool and/or accessory connected to the rotor shaft assembly outside of the stator assembly of the electric motor. The electrical insulation is connected to the at least one section outside of the stator assembly and its presence, condition and conformance against safety requirements may be easily verified.

In an example in accordance with at least some embodiments, the electrical insulator 112 comprises at least one first portion 111a for connecting with the at least one section 106a and at last one second portion for connecting with the output shaft 114a, 114b. Accordingly, tools and/or accessories may be connected to the electrical insulator via the output shaft. In an example, the output shaft may serve for an adapter between the electrical insulator and tools and/or accessories, whereby various tools and/or accessories may be connected to the rotor shaft assembly and safely driven by the rotor shaft assembly.

In an example, the at least one first portion 111a may be formed to be a counterpart to the at least one section 106a. The at least one first portion 111a and the at least one section 106a may be configured to form a nested connection, where the at least one first portion 111a and the at least one section 106a are at least partially inside one another. In this way the electrical insulator connected to the at least one section 106a may form a part of the rotor shaft assembly 100a, 100b. In an example, the at least one first portion 111a of the at least one section 106a may comprise one or more cavities and/or one or more protrusions. The cavities and protrusions may be arranged in the axial direction 105 or in a radial direction, or a direction parallel to a radius of the rotor shaft assembly 100a, 100b. The cavities and protrusions may provide an interference fit and/or a locking of the electrical insulator 112 with the at least one section 106*a*.

In an example in accordance with at least some embodiments, the at least one section 106*a* comprises an axial cavity 128 for a nested connection with the electrical insulator 112 connected to the at least one section 106*a*. The axial cavity provides that the electrical insulator may be at least partially inside the at least one section, whereby the electrical insulation and the at least one section may have one or more radial surfaces and one or more axial surfaces, or walls 130, that are in contact with one another. The walls may extend parallel to the axial direction from at least one radial surface, or a bottom of the axial cavity. In this way a mouth of the axial cavity is formed by the walls and the mouth is open towards the electrical insulator 112. Contacting surfaces of the electrical insulator and the at least one section support torque transfer to tools and/or accessories driven by the rotor shaft assembly.

In an example in accordance with at least some embodiments, the axial cavity 128 may comprise at least one roughened surface 129 for contacting with the electric insulator. In this way contact between the axial cavity and the electrical insulator may be improved. The roughened surface may be obtained by mechanically processing, e.g. by broaching, hobbing, honing and/or knurling, ferromagnetic material.

In an example in accordance with at least some embodiments, the axial cavity 128 comprises one or more walls 130 extending in the axial direction 105 of the rotor shaft and the one or more walls 130 comprise one or more through-holes 132. The walls of the axial cavity provide that the electrical insulator that is at least partially received inside the axial cavity may be supported in the radial direction of the rotor shaft assembly. On the other hand the through-holes provide that electrically insulating material of the electrical insulator on different sides of a wall may be connected via the through-holes. In this way movement, e.g. the insulator spinning inside the axial cavity, of the electric insulator may be limited in the axial direction 105. Preferably, the walls and through-holes provide that a position of the electric insulator is fixed, or locked, with respect to the at least one section 106*a*, whereby structural strength of the rotor shaft assembly may be supported. In an example, the electrical insulator may be injection molded inside and over the axial cavity, whereby the walls are at least partially enclosed into the electrical insulator and portions of the electric insulator located radially on different sides of the walls are connected via the through-holes. In an example the axial cavity comprises at least one wall 130 that is arranged circular with respect to the axial direction 105.

In an example in accordance with at least some embodiments, the one or more walls 130 comprise more than one through-hole 132 arranged on the one or more walls 130 at different radial and/or axial positions. Different axial positions may be located at positions that are separated in the axial direction 105. Different radial positions may be located at positions that are separated in the radial direction. Having more than one though-hole may support locking the electrical insulator to its position with respect to the at least one section 106*a* and/or distribution of the electrically insulating material during injection molding of electrically insulating material inside and over the axial cavity 128. The distribution of the electrically insulating material during the injection molding may be further supported if the through-holes are at radial position that are evenly distributed around the rotor shaft assembly.

In an example, the through-holes 132 may comprise two or more through-holes that are radially and/or axially at different positions. For example, the through-holes may be arranged in pairs of through-holes, where a pair of through-holes comprises two axially separated through-holes. The radial position of the through-holes of the pair may be the same, whereby the through-holes of the pair are aligned with the axial direction 105. Two pairs of through-holes may be arranged radially on opposite sides of the axial cavity 128.

In an example in accordance with at least some embodiments, the output shaft 114*a*, 114*b* comprises a roughened surface 124 for connecting with the electrical insulator and the at last one second portion comprises a cavity 127 for an interference fit between the cavity and the output shaft that is at least partially received within the cavity. The roughened surface may be obtained by mechanically processing the output shaft, e.g. by honing or knurling.

In an example in accordance with at least some embodiments, the output shaft 114*a*, 114*b* comprises an inside thread 115 or an outside thread 117 for connecting to the tool and/or accessory. The inside thread provides that an outside thread of a tool and/or accessory may be received into the output shaft 114*a*. On the other hand the outside thread provides that the output shaft 114*b* may be received within an inside thread of a tool and/or accessory connected to the output shaft.

Figure 13:
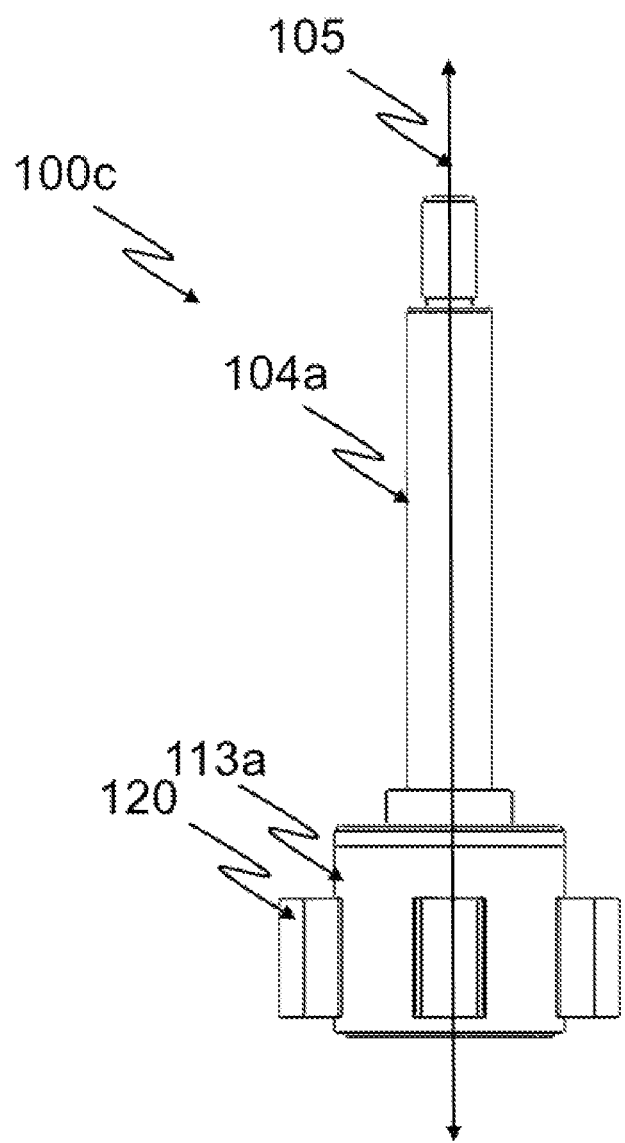
FIGS. 13 and 14 illustrate an example of a rotor shaft assembly in accordance with at least some embodiments.
Figure 14:
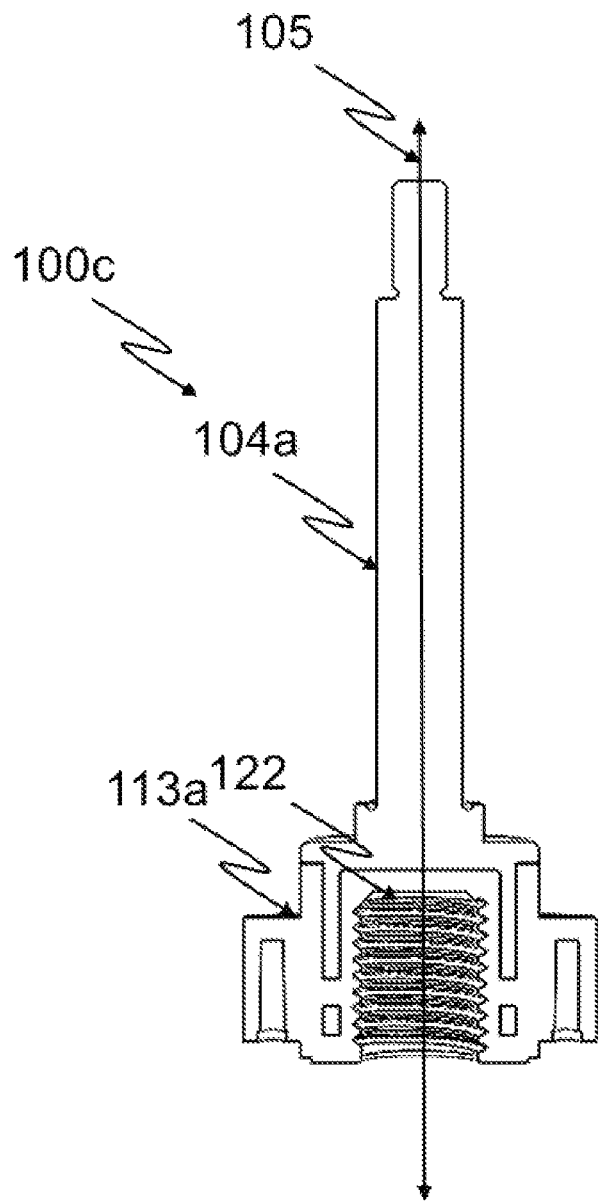
Figure 15:
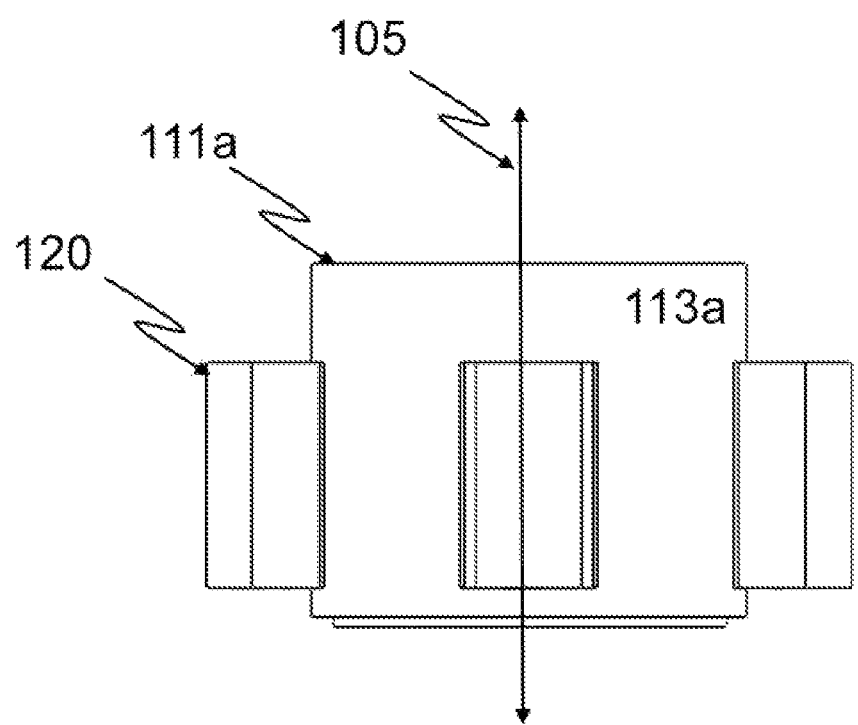
FIGS. 15 and 16 illustrate an example of an electric insulator in accordance with at least some embodiments.
Figure 16:
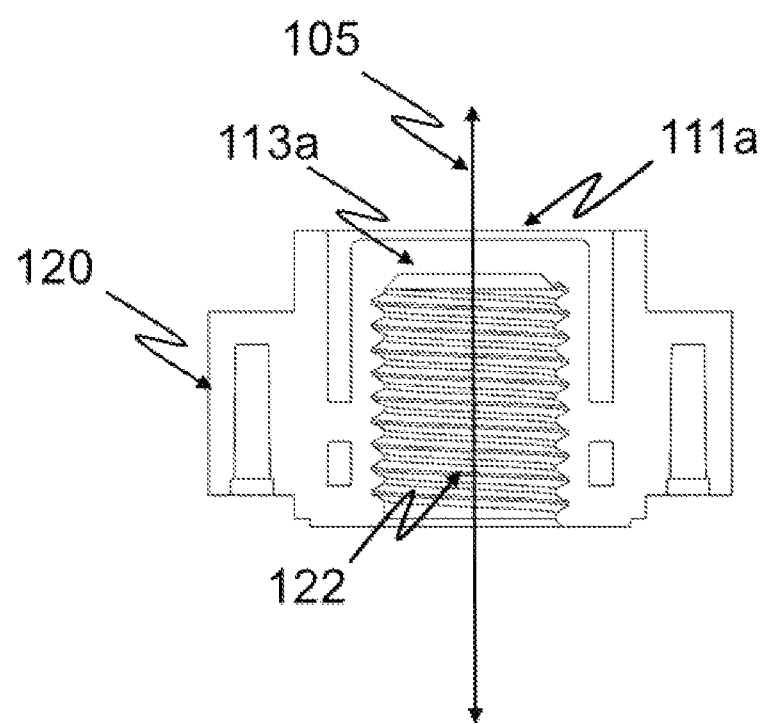
Figure 17:
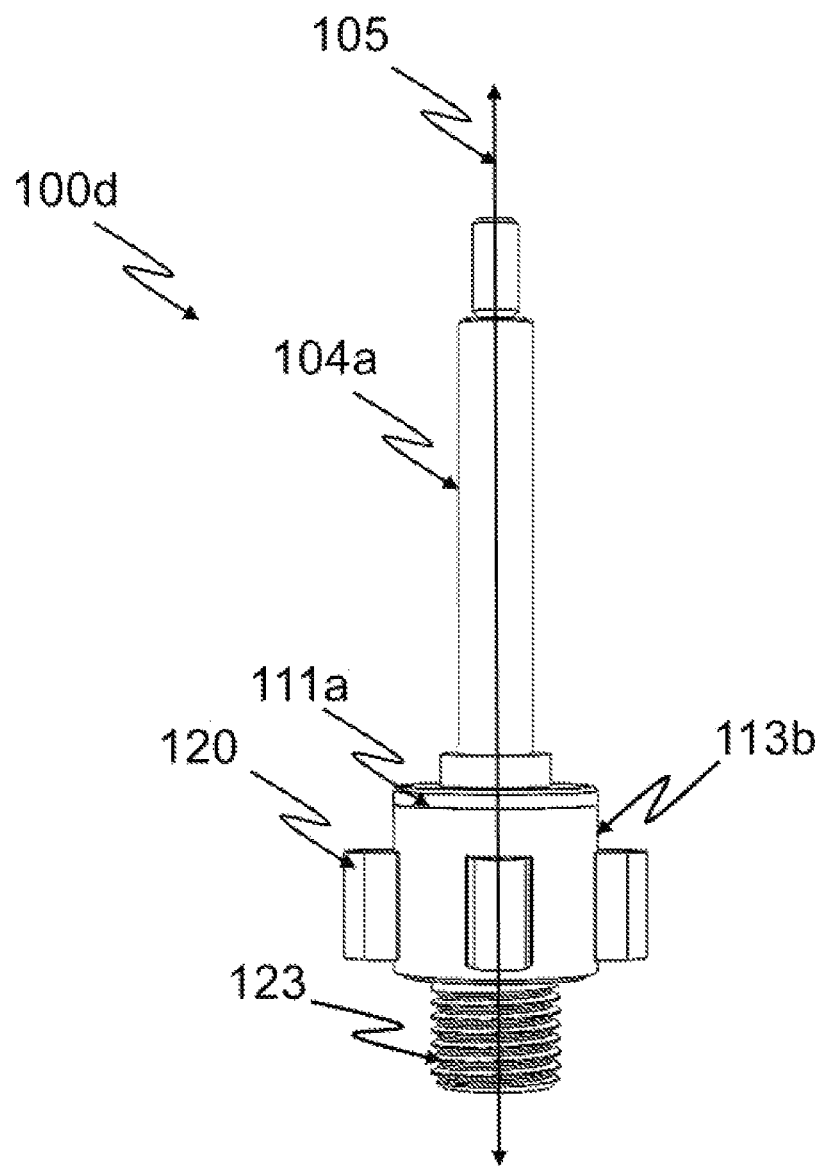
FIGS. 17 and 18 illustrate an example of a rotor shaft assembly in accordance with at least some embodiments.
Figure 18:
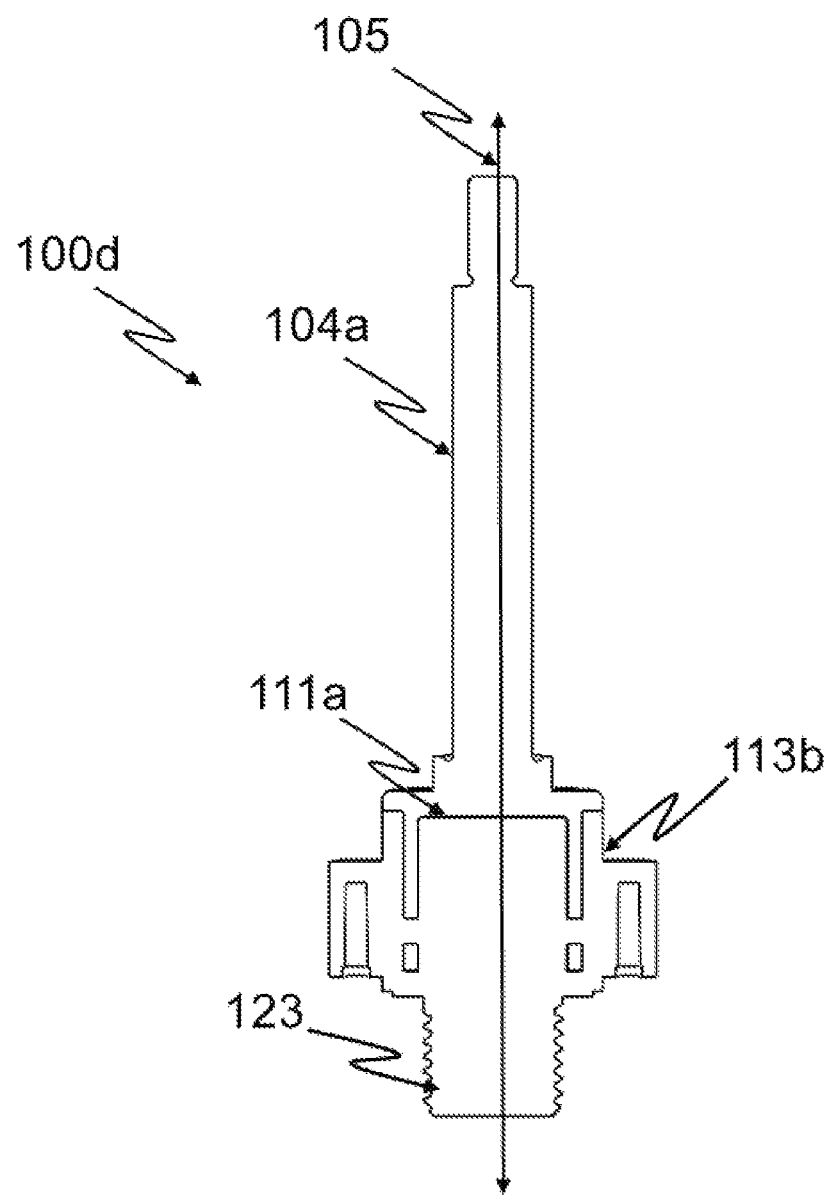
Figure 19:
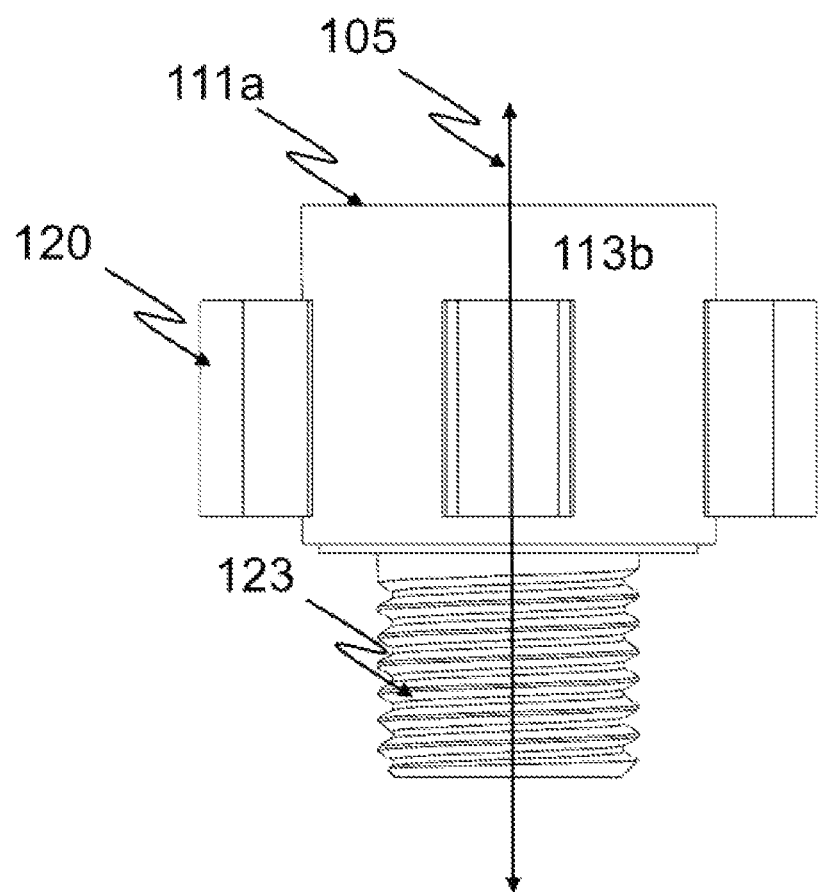
FIGS. 19 and 20 illustrate an example of an electric insulator in accordance with at least some embodiments.
Figure 20:
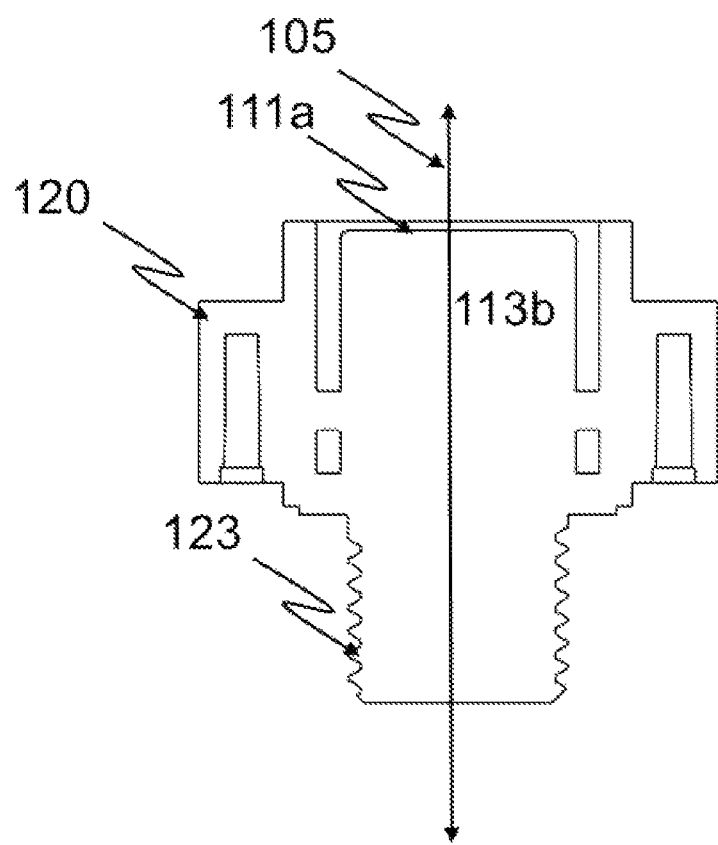

FIGS. 13-20 illustrate constructions of rotor shaft assemblies for connecting to a tool and/or accessory without an output shaft. The constructions of FIGS. 13-20 are described with reference to at least part of the items described with FIGS. 1-12. FIGS. 13 to 14 illustrate a rotor shaft assembly 100*c* comprising the part of FIG. 1 connected to an electrical insulator 113*a* comprising an inside thread 122 for connecting directly to a tool and/or accessory without an output shaft. FIG. 14 is a cross-sectional view of the rotor shaft assembly 100*c* of FIG. 13 in an axial direction 105 of the rotor shaft assembly. FIGS. 15 and 16 illustrate an example of an electrical insulator 113*a* for the rotor shaft assembly 100*c* described with FIGS. 13 and 14. FIG. 16 is a cross-sectional view of the electrical insulator 113*a* of FIG. 15 in an axial direction 105 of the rotor shaft assembly. FIGS. 17 to 18 illustrate a rotor shaft assembly 100*d* comprising the part of FIG. 1 connected to an electrical insulator 113*b* comprising an outside thread for connecting with a tool and/or accessory without an output shaft. FIG. 18 is a cross-sectional view of the rotor shaft assembly 100*d* of FIG. 17 in an axial direction 105 of the rotor shaft assembly. FIGS. 19 and 20 illustrate an example of an electrical insulator 113*b* for the rotor shaft assembly 100*d* described with FIGS. 17 and 18. FIG. 20 is a cross-sectional view of the electrical insulator 113*b* of FIG. 19 in an axial direction 105 of the rotor shaft assembly 100*d*.

Referring to FIGS. 13 to 20, the rotor shaft assembly 100*c*, 100*d* comprises an electrical insulator 113*a*, 113*b* connected to the at least one section 106*a* and the electrical insulator 113*a*,113*b* is configured to connect directly to a tool and/or accessory to be driven by the electric motor. In this way, the electrical insulator may provide electrical insulation to the output shaft, tool and/or accessory connected directly to the rotor shaft assembly outside of the stator assembly of the electric motor.

In accordance with at least some embodiments, the electrical insulator 113*a*, 113*b* comprises at least one first portion 111*a* for connecting with the at least one section 106*a* and at last one second portion configured to connect directly with a tool and/or accessory to be driven by the electric motor. In this way tools and/or accessories may be connected directly to the rotor shaft assembly without an output shaft between the electrical insulator and the tools and/or accessories. Examples of the second portion comprise at least an inside thread 122 or an outside thread 123.

In an example, the at last one second portion comprises an inside thread 122 or an outside thread 123 for connecting to the tool and/or accessory. The inside and outside thread may be designed to engage with threading of the tool and/or accessory. The inside thread 122 provides that an outside thread of the tool and/or accessory may be received into a cavity of the electrical insulator 113*a* comprising the inside thread. On the other hand the outside 123 thread provides that the electrically insulating material may be received within a cavity of the tool and/or accessory connected to the electrical insulator.

Figure 21:
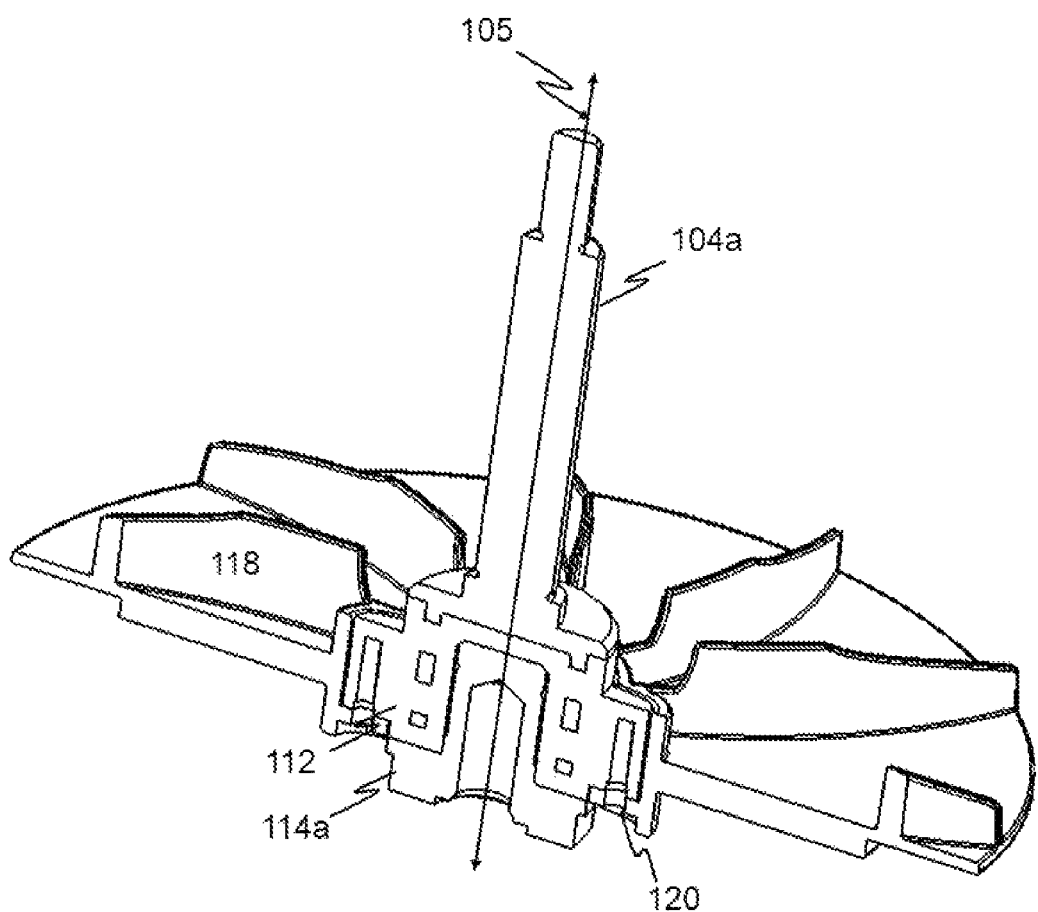
FIG. 21 illustrates an example of a rotor shaft assembly comprising a fan in accordance with at least some embodiments.

One or more of the rotor shaft assemblies 100*a*, 100*b*, 100*c*, 100*d* described with FIGS. 1 to 26 may comprise an electrical insulator that is shaped to comprise a fan or may comprise one or more connectors for connecting a fan to the one or more rotor shaft assemblies. FIG. 21 illustrates an example of the rotor shaft assembly 100*a* described with reference to FIGS. 5 and 6, where the electrical insulator 112 of the rotor shaft assembly comprises one or more connectors 120 for a fan 118. The one or more connectors form a fan at the electrical insulator 112 provide that a separate fan may be connected to the electrical insulator, whereby the fan and the electrical insulator may be manufactured separately. When the fan is connected to the electrical insulator 112, the fan may be rotated by the rotor shaft assembly for cooling the electric motor. Examples of the connectors comprise holes or passages. The holes or passages may optionally be provided with inside threads. The fan may be attached by e.g. by screws to the connectors. On the other hand, if the electrical insulator is shaped to comprise a fan, the manufacturing of the electrical insulator and the fan may be combined to provide a uniform piece serving both for electrically insulating an output shaft, tool and/or accessory connected to the rotor shaft assembly as well as for causing a flow of coolant fluid, when the rotor shaft assembly is rotated.

Figure 22:
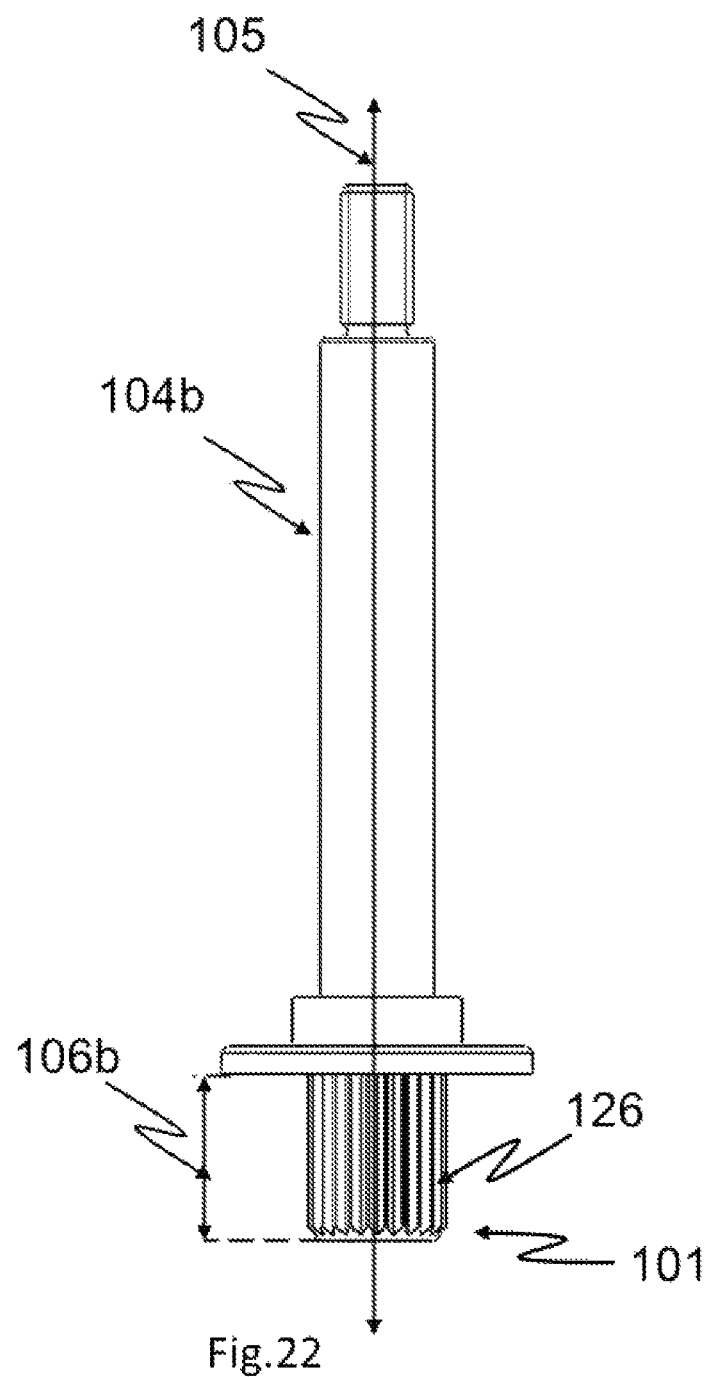
FIG. 22 illustrates an example of a part of a rotor shaft assembly in accordance with at least some embodiments.

FIG. 22 illustrates an example of a part of a rotor shaft assembly in accordance with at least some embodiments. The part 104*b* is described with reference to items described with FIGS. 1-6. The part 104*b* may be configured to be rotatably mounted inside a stator assembly of an electric motor and to extend out of the stator assembly in an axial direction 105 of the rotor shaft assembly. Accordingly, the part 104*b* corresponds with the part 104*a*, where the at least one section 106*a* comprises an axial cavity 128 for a nested connection with the electrical insulator 112 connected to the at least one section 106*a*, with a difference that instead of the axial cavity 128, the at least one section 106*b* comprises a roughened surface 126 for transferring torque to the electrical insulator 112 connected to the at least one section 106*b*. The roughened surface may be at the bottom end 101 of the part 104*b*. The roughened surface supports torque transfer from the part 104*b* to an electrical insulator that has an axial cavity for receiving at least a part of the at least one section 106*b*. Examples of the roughened surface of the at least one section comprise a mechanically processed surface such as a honed surface, a knurled surface, a broached surface and a hobbed surface.

Figure 23:
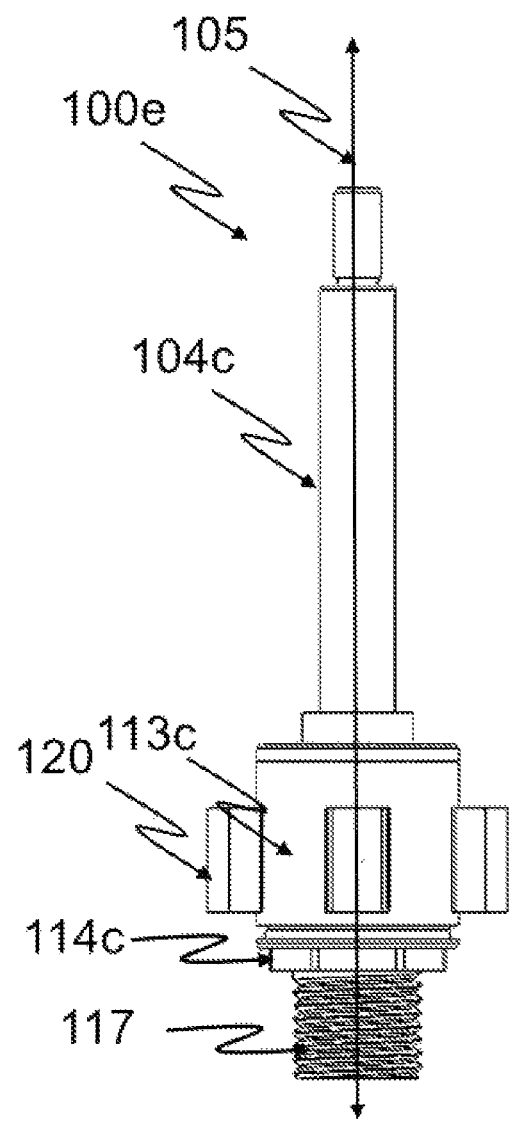
FIG. 23 and FIG. 24 illustrate a construction of a rotor shaft assembly for connecting to a tool and/or accessory via an output shaft 114c.
Figure 24:
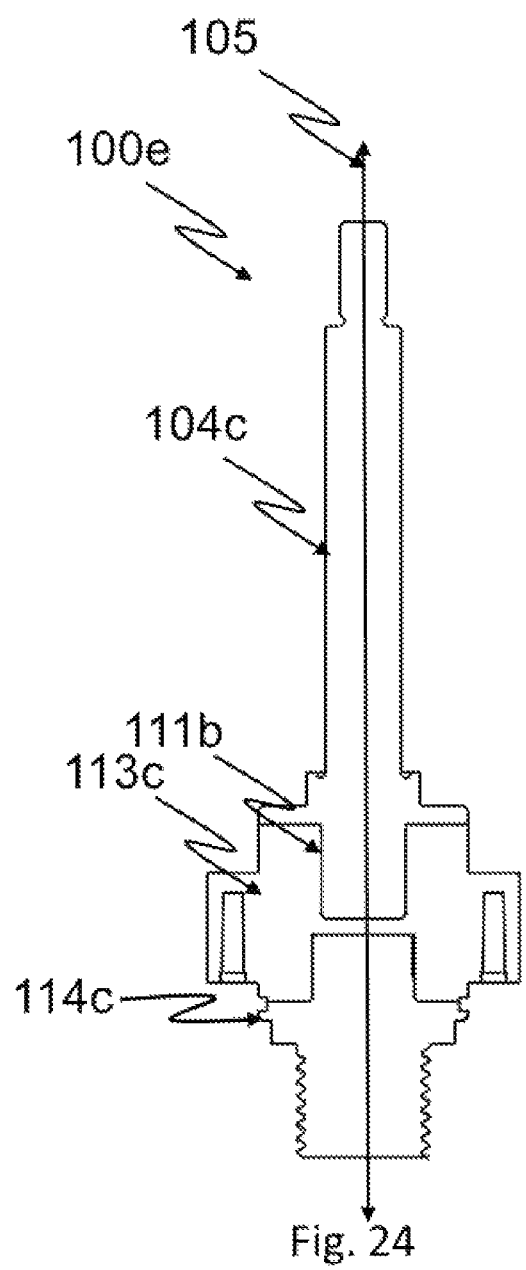

FIG. 23 and FIG. 24 illustrate a construction of a rotor shaft assembly for connecting to a tool and/or accessory via an output shaft 114*c*. The rotor shaft assembly 100*e* comprises a part 104*c* of a rotor shaft assembly in accordance to described with the part 104*b* of FIG. 22 connected to an electrical insulator 113*c* and an output shaft 114*c* comprising an outside thread 117 for connecting with a tool and/or accessory. FIG. 24 is a cross-sectional view of the rotor shaft assembly 100*e* of FIG. 23 in an axial direction 105 of the rotor shaft assembly. The electric insulator 113*c* may have at least one first portion 111*b* for a nested connection with the at least one section 106*b* and at last one second portion configured to connect with the output shaft 114*c*. The electrical insulator 113*c* comprises an axial cavity at the first portion 111*b* and the part 104*c* is received within the axial cavity for a nested connection between the electrical insulator and the part 104*c*. The output shaft 114*c* and part 104*c* are received inside respective cavities. The electrical insulator separates the bottoms of the cavities, whereby electrical coupling between the output shaft 114*c* and the part 104*c* may be prevented.

Figure 25:
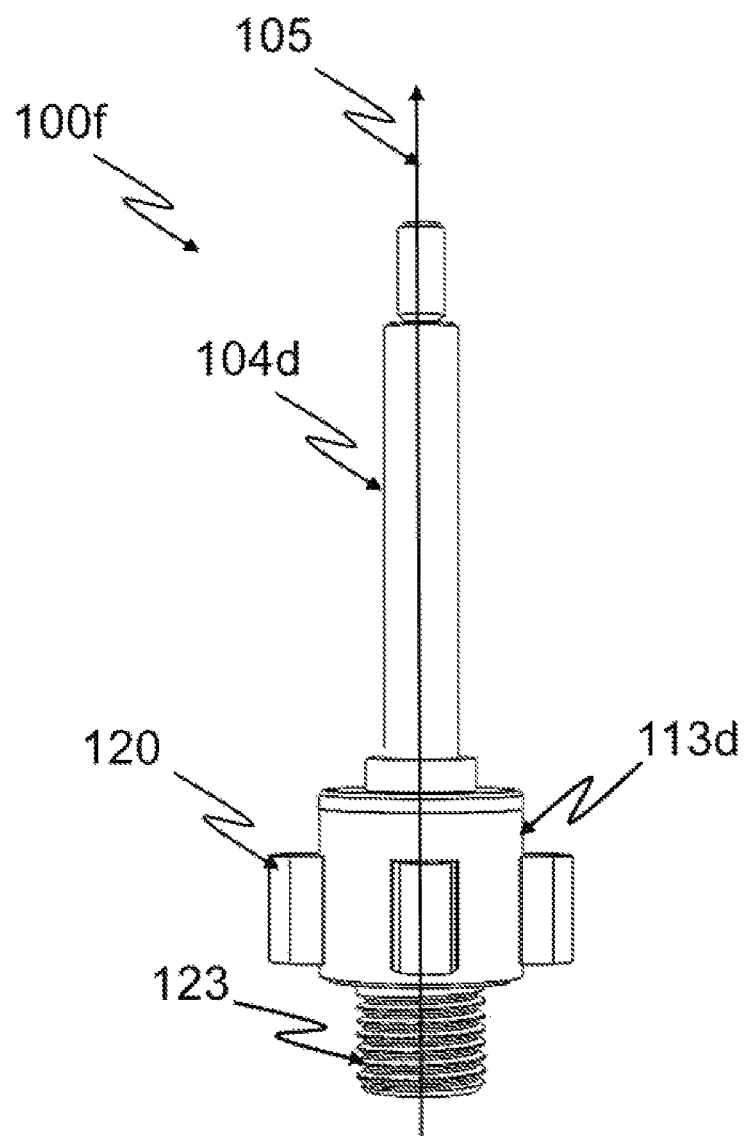
FIGS. 25 and 26 illustrate a construction of a rotor shaft assembly for connecting to a tool and/or accessory without an output shaft.
Figure 26:
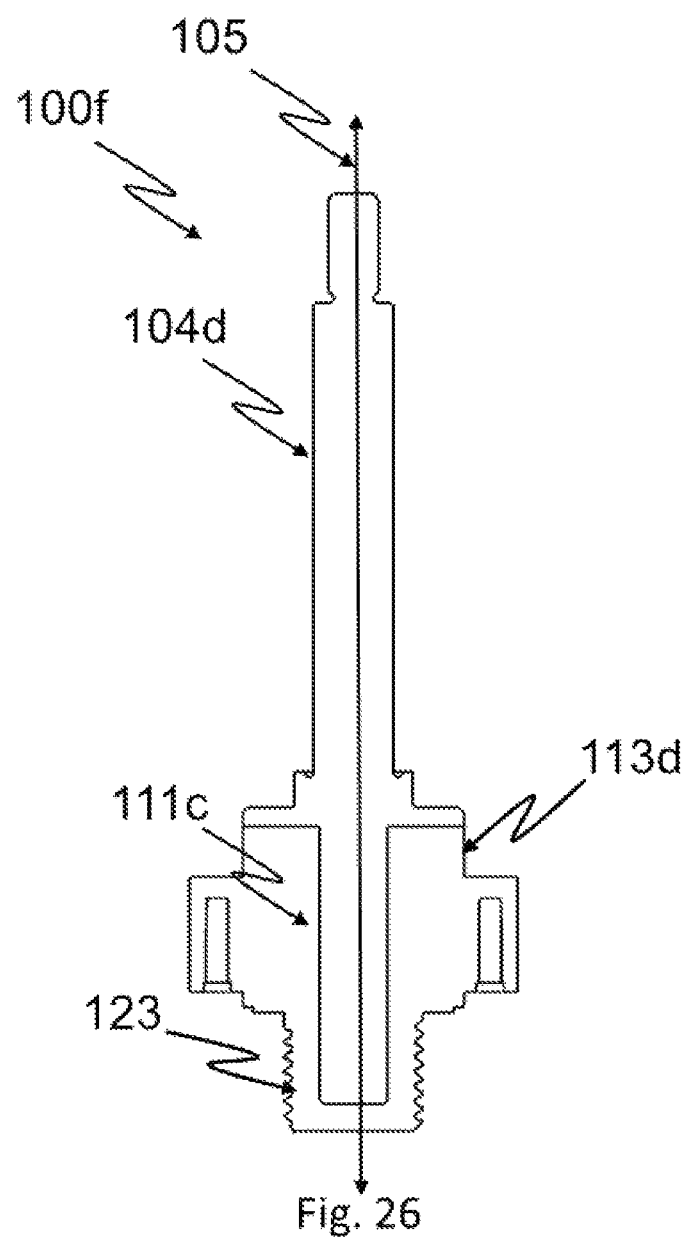

FIGS. 25 and 26 illustrate a construction of a rotor shaft assembly for connecting to a tool and/or accessory without an output shaft. The rotor shaft assembly 100*f* comprises a part 104*d* of a rotor shaft assembly in accordance to described with the part 104*b* of FIG. 22 connected to an electrical insulator 113*d* and an output shaft 114*b* comprising an outside thread 117 for connecting directly to a tool and/or accessory without an output shaft. FIG. 26 is a cross-sectional view of the rotor shaft assembly 100*f* of FIG. 25 in an axial direction 105 of the rotor shaft assembly. The electric insulator 113*d* may have at least one first portion 111*c* for connecting with the at least one section 106*b* and at last one second portion configured to connect directly with a tool and/or accessory to be driven by the electric motor. In this way tools and/or accessories may be connected directly to the rotor shaft assembly without an output shaft between the electrical insulator and the tools and/or accessories. The electrical insulator 113*d* comprises an axial cavity at the first portion 111*c* and the part 104*d* is received within the axial cavity for a nested connection between the electrical insulator and the part 104*d*. Since the electrical insulator 113*d* may be connected directly to the tools and/or accessories, the part 104*d* may be received inside the electrical insulator without being blocked by the output shaft connected to the electrical insulator or a cavity of the output shaft. Therefore, the part 104*d* may extend to a depth, where the electrical insulation and structural strength at the at last one second portion is still sufficient for connecting to the tools and/or accessories. Examples of the second portion comprise at least an outside thread 123. The part 104*d* may extend axially up to the outside thread and even further up to the end of the electrical insulator towards the tools and/or accessories, provided the electrical insulation and structural strength at the at last one second portion is still sufficient for connecting to the tools and/or accessories.

In accordance with at least some embodiments, one or more of the rotor shaft assemblies 100*a*, 100*b*, 100*c*, 100*d*, 100*e*, 100*f* described with FIGS. 1 to 26 may comprise that the electrical insulator 112,113*a*, 113*b*, 113*c*, 113*d* comprises an axial cavity for a nested connection with the at least one section 106*a*, 106*b*. In this way the roughened surface 126 may be at least partially received within the electrical insulator for an interference fit between the electrical insulator and the at least one section 106*a*, 106*b*.

In accordance with at least some embodiments, one or more of the rotor shaft assemblies 100*a*, 100*b*, 100*c*, 100*d*, 100*e*, 100*f* described with FIGS. 1 to 26 may comprise that the electrical insulator 112,113*a*, 113*b*, 113*c*, 113*d* is connected to the at least one section 106*a*, 106*b* by injection molding the electrical insulator from electrically insulating material or the electrical insulator is configured to connect to the at least one section by 3D-printing the electrical insulator from electrically insulating material. The 3D-printed electrical insulator may be connected to the at least one section by an interference fit.

Figure 27:
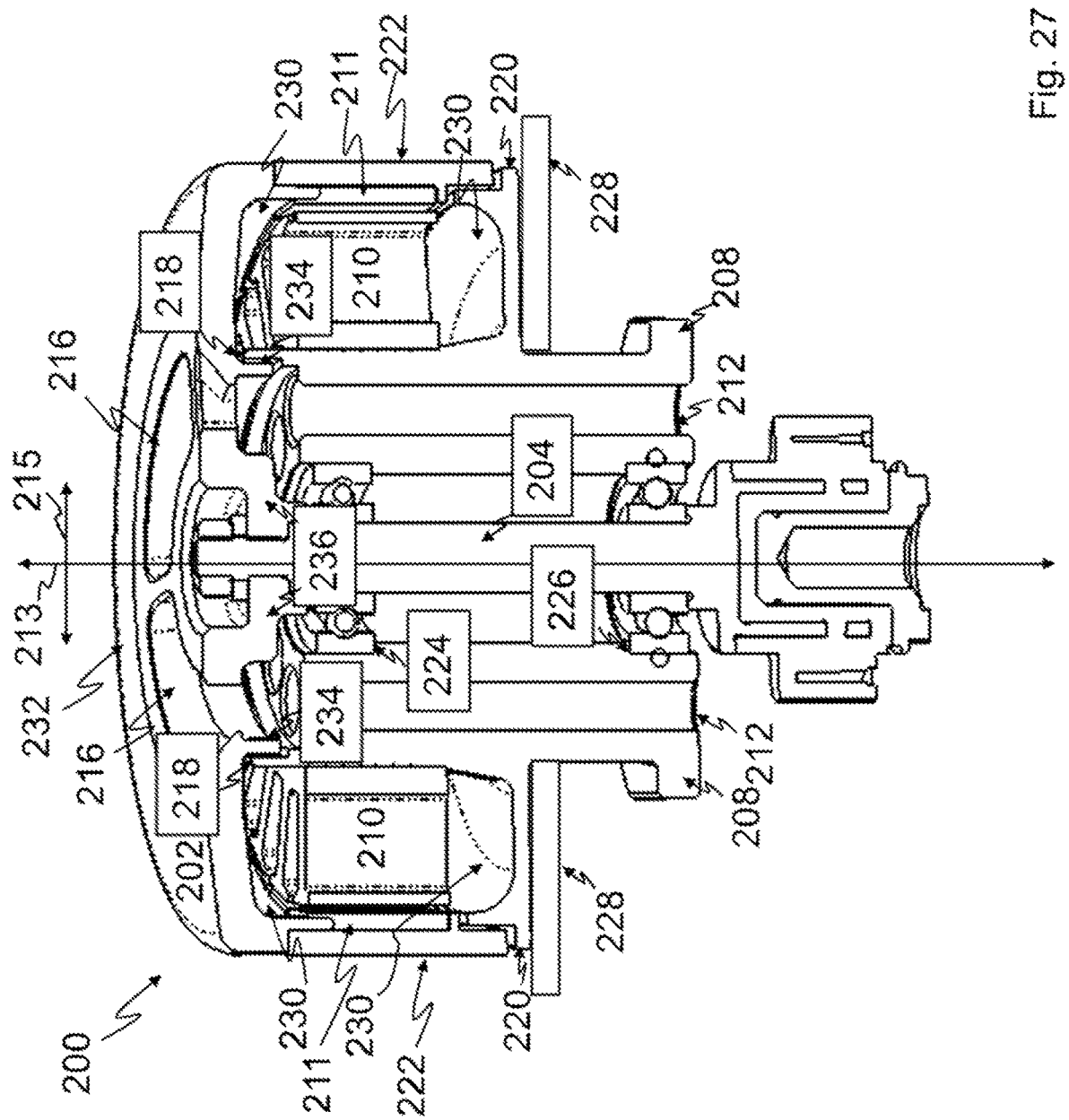
FIG. 27 illustrates an electric motor in accordance with at least some embodiments.

FIG. 27 illustrates an electric motor comprising rotor shaft mounted rotatably inside a stator assembly. The rotor shaft comprises at least one section that is configured to extend in an axial direction of the rotor shaft outside of a stator assembly 208 of the electric motor, when the rotor shaft is mounted rotatably inside the stator assembly, and said at least one section comprises means for transferring torque to electrically insulating material arranged to said at least one section. Examples of the rotor shaft and parts of the rotor shaft are described with FIGS. 1 to 26.

In FIG. 27, the electric motor is illustrated by a cross-section of the electric motor in a longitudinal direction 213, i.e. an axial direction, of a rotor shaft 204 of the electric motor. The electric motor may be a brushless direct current, BLDC, electric motor 200. It should be noted that a brushless direct current, BLDC, electric motor may alternatively or additionally be referred to an electronically commutated motor (ECM or EC motor) or a synchronous DC motor. On the other hand, the BLDC electric motor 200, may be referred to an outrunner motor on the basis of the physical construction of the BLDC electric motor. FIG. 27 illustrates an outrunner motor that comprises a stator comprising electromagnets 210 which are arranged annular to the rotor shaft 204 and form a center (core) of the motor.

The electromagnets 210 of the outrunner motor are surrounded by an overhanging rotor that comprises permanent magnets 211. The overhanging rotor may comprise an outer shell 202 connected to the rotor shaft 204. In the outrunner motor, the outer shell is caused to rotate by selectively switching DC to the electromagnets, which causes a rotation of the rotor shaft. The permanent magnets 211 may be arranged annularly with respect to the electromagnets, e.g. on the inner surface of the outer shell.

An example of the stator is a stator assembly, comprising a body or a stator hub 208 that is arranged annular to the rotor shaft 204. The rotor shaft 204 may extend through the stator hub and connected rotatably, e.g. by one or more bearing assemblies, to the stator hub. In accordance with at least some examples, the stator hub may comprise cooling channels 212 for cooling down the BLDC electric motor 200.

The BLDC electric motor 200 comprises cooling channels 212 that extend through the stator in the longitudinal direction 213 of the rotor shaft 204. The cooling channels comprise openings at ends that are separated from each other at least in the longitudinal direction 213 of the rotor shaft. The cooling channels provide that a fluid, i.e. a coolant fluid, for example a liquid, a gas, a mixture of gases such as air, may flow through the cooling channels via the openings of the cooling channels for cooling down the BLDC electric motor. In this way, particularly those parts of the BLDC electric motor that are operatively connected to the cooling channels for transferring heat into the coolant fluid flowing inside the cooling channels may be cooled by the coolant fluid. Examples of liquids for cooling the BLDC comprise at least water. It should be noted that for certain coolant fluids, e.g. water, sealings may be adapted and added to the BLDC electric motor for controlling flow of the coolant as needed and to avoid the coolant damaging the BLDC electric motor. In an example the heat transfer may be provided by a material of the parts of the BLDC electric motor that are in contact with the cooling channels. Since the cooling channels extend through the stator, at least the material of the stator hub, where the cooling channels 212 are located, should support efficient heat transfer from the BLDC electric motor to the coolant fluid inside the cooling channels. An example of a material that provides efficient heat transfer is Aluminum (Al).

The cooling channels 212 may be arranged annularly with respect to the rotor shaft 204, between the rotor shaft and the electromagnets 210, whereby the electromagnets arranged around the cooling channels in a radial direction 215 of the rotor may be cooled down by the coolant fluid flowing through the cooling channels. Accordingly, the cooling channels may extend between the rotor shaft and the electromagnets 210. In an example, the cooling channels 212 may be arranged around the rotor shaft 204 at even distances, whereby an even heat transfer from the BLDC electric motor to the coolant fluid inside the cooling channels may be supported.

The cooling channels 212 provide longitudinal passages between openings of the cooling channels. The passages may have cross-sections that may be of various forms that support cooling of the parts of the BLDC electric motor, e.g. electromagnets, by a flow of coolant fluid via the cooling channels. Examples of the cross-sections comprise at least circular cross-sections, rectangular cross-sections and/or arched cross-sections. It should be noted that the cooling channels may also have other shapes depending on the structure of the BLDC electric motor and implementation requirements for cooling the BLDC electric motor.

The BLDC electric motor may comprise a fan arranged at one end of the cooling channels 212 for controlling a direction of fluid flow via the cooling channels. The fan is configured to be rotated by the rotor shaft 204 for producing a pressure difference over the fan in the longitudinal direction 213 of the rotor shaft, and hence force, the fluid flow through the fan and into the cooling channels or out of the cooling channels. The outer shell 202 may serve as the fan or the BLDC electric motor comprises a separate fan connected to the rotor shaft 204. In an example, the fan may be positioned at a side of the BLDC electric motor, where the stator hub is uncovered and/or the electromagnets are uncovered. The side of the BLDC electric motor, where the stator hub is uncovered and/or the electromagnets are uncovered may be a side, where the outer shell 202 is not covering the stator hub and/or the electromagnets 210. The stator hub may be uncovered for example at least at one side of opposite sides, e.g. at a top side and at a bottom side, in the longitudinal direction 213 of the rotor shaft. In the illustrated example, the outer shell 202 is shown covering a top side of the electromagnets 210 and the stator hub 208, whereby the fan may be arranged to an opposite side of the stator hub in the longitudinal direction 213 of the rotor shaft, e.g. at a bottom side, of the BLDC electric motor. When positioned at the bottom side of the stator hub, rotation of the fan may cause a negative pressure inside the cooling channels 212. This causes coolant fluid to be drawn into the cooling channels through the openings of the cooling channels at the top side of the BLDC electric motor and out of the cooling channels via openings of the cooling channels at the bottom side the BLDC electric motor.

The electromagnets 210 may be enclosed in a sealed space 230 for preventing contamination of the electromagnets 210 by particles carried by the fluid flow. The sealed space may be formed by the stator hub, the outer shell 202 and sealing structures 218,220 between the stator hub and the outer shell. The cooling channels 212 run outside of the sealed space between the sealed space and the rotor shaft 204, whereby the electromagnets 210 are protected against particles such as dust and/or debris carried by the coolant fluid.

The sealing structures 218,220 may be configured to support a rotational movement of the stator and the outer shell 202 with respect to each other. The sealing structures may be configured to support the rotational movement of the stator and the outer shell with respect to each other at least, when a mechanical friction caused by the sealing structures to the rotational movement between the stator and the outer shell is small and/or the sealing structures do not cause mechanical friction to the rotational movement between the stator and the outer shell. Examples of sealing structures that may provide a small or a very small friction may comprise shaft sealings and bearing assemblies. Examples of sealing structures that may provide frictionless sealing comprise non-contact sealings such as labyrinth sealings. The sealed space 230 may comprise more than one type of sealing structures. For example, one of the sealing structures 218 may be a shaft sealing or a bearing assembly, and another one of the sealing structures may be a non-contact sealing such as a labyrinth sealing.

The outer shell 202 may comprise a surface 232, e.g. a top surface, that is connected to the rotor shaft 204 and configured to extend at least in the radial direction 215 of the rotor on one side of the electromagnets 210. In this way the outer shell 202 may serve for covering the electromagnets 210 on the one side, e.g. the top side. The outer shell may also comprise an annular part 222 that is arranged to extend in a direction that is parallel to a longitudinal direction of the rotor shaft. Accordingly, it should be noted that the annular part may form a part of the outer shell 202. The annular part may cover a side of the electromagnets 210 and the stator hub 208 that extends parallel to the longitudinal direction 213 of the rotor shaft. The permanent magnets 211 may be attached to the annular part at positions, where the permanent magnets surround the electromagnets. For attaching to the permanent magnets, the annular part may comprise ferromagnetic material, e.g. iron. Positioning the permanent magnets at the annular part provides that, when the electromagnets 210 are selectively activated by the DC, rotation of the outer shell may be caused at a desired speed and torque. It should be noted that in some examples, the annular part 222 of the outer shell may comprise one or more through-openings.

The outer shell 202 may be configured to provide one or more passages for the flow of the coolant fluid from outside of the BLDC electric motor into the cooling channels 212 or vice versa. For this purpose, the outer shell may be provided with one or more through-openings 216 that allow the coolant fluid to flow through the outer shell in the direction 213 of length of the rotor shaft and/or in a direction that is parallel to a radial direction 215 of the rotor. In an example, a through-opening may comprise orifices on opposite sides of the outer shell and connected by a passage through the outer shell. In an example, the through-openings may be provided on a surface, e.g. the top surface 232, of the outer shell that extends in a direction that is parallel to a radial direction 215 of the rotor and covers the electromagnets from one side, e.g. from the top or from the bottom. In another example, the through-openings may be provided on a surface, e.g. surface of the annular part 222, of the outer shell 202 that is arranged to extend in a direction that is parallel to a longitudinal direction 213 of the rotor shaft and covers the electromagnets on one or more sides that may be arranged for example annular to the rotor shaft. The through-openings may be rectangular openings, circular openings and/or openings that are arched with respect to the rotor shaft. The outer shell may be at least partly of material, e.g. Al, that provides efficient heat transfer, whereby the outer shell may serve for cooling of the electromagnets.

The one or more through-openings 216 of the outer shell 202 may be shaped for causing a fluid flow through the cooling channels 212, whereby the outer shell 202 may serve as a fan. In this way the outer shell may produce a pressure difference over the fan in the longitudinal direction 213 of the rotor shaft, and hence force, the fluid flow through the fan and into the cooling channels or out of the cooling channels. In this way, the fluid flow through the cooling channels may be supported even without a separate fan connected to the rotor shaft 204.

In an example, the one or more through-openings 216 may provide inlets for the coolant fluid on a top surface 232 of the outer shell 202. On an opposite side, e.g. a bottom side, of the top surface of the outer shell 202, a passage may be provided for guiding the coolant fluid into the cooling channels 212. The passage may be formed by annular structures 234, 236 of the outer shell 202. The annular structures may extend between the through-openings and the stator hub 208, and between the through-openings the rotor shaft 204. One of the annular structures 234 may form one or more outer edges of the through openings and one of the annular structures 236 may form one or more inner edges of the through openings. The outer and inner edges may be defined based on the radial direction 215 of the rotor. The annular structure 236 forming the one or more inner edges may extend between the through-openings and the rotor shaft 204, and the annular structure 234 forming the one or more outer edges may extend between the through-openings and the stator hub. Accordingly, the annular structures 236,234 may be annular to the rotor shaft and the annular structure 236 forming the one or more inner edges may be closer to the rotor shaft in the radial direction 215 than the annular structure 234 forming the one or more outer edges. In this way the cooling channels may be positioned between the annular structures 234, 236 in the radial direction of the rotor. A sealing structure may connect the annular structure 234 to the stator hub. A connection between the annular structure 236 and the rotor shaft may be an interference fit.

The stator hub 208 may comprise mounting positions 224,226 for bearing assemblies. The bearing assemblies mounted to the mounting positions connect the rotor shaft 204 rotatably with respect to the stator. In this way, the rotor shaft 204 may be rotated at a desired torque and speed with respect to the stator, when the electromagnets 210 are selectively activated by DC.

The mounting positions 224,226 for bearing assemblies may be separated in the longitudinal direction of the rotor shaft 204, for example the mounting positions may be arranged at the stator hub to positions that are separated in the longitudinal direction of the rotor shaft on the basis of a length of the cooling channels 212. Accordingly, the mounting positions may be separated by substantially, e.g. at most, by the length of the cooling channels, whereby the cooling channels may extend between the mounting positions for cooling both the bearing assemblies at the mounting positions and the electromagnets.

In accordance with at least some embodiments, the BLDC electric motor comprises a rotor 202 comprising a rotor shaft 204 and a stator arranged around the rotor shaft. The stator comprises a stator hub 208 comprising electromagnets 210, and cooling channels 212 extending in a direction that is parallel to a longitudinal direction 213 of the rotor shaft and the cooling channels 212 are positioned between the rotor shaft 204 and the electromagnets 210. The positioning of the cooling channels provides that the stator may be cooled by a coolant fluid flowing through the cooling channels.

In accordance with at least some embodiments, the rotor, comprises an outer shell 202 connected to the rotor shaft 204 and the outer shell is configured to extend in a direction that is parallel to a radial direction 215 of the rotor on one side of the electromagnets 210 for covering the electromagnets 210. The outer shell comprises one or more through-openings 216 for passage of fluid between surroundings of the BLDC electric motor and the cooling channels 212. In this way the outer shell allows a coolant fluid to pass through the outer shell, while also covering the electromagnets and the permanent magnets 211 against particles carried by the coolant fluid.

In accordance with at least some embodiments, the one or more through-openings 216 are positioned between the electromagnets 210 and the rotor shaft 204 in a radial direction of the rotor. The positioning of the through-openings provides that the electromagnets may be covered by a surface of the outer shell that extends in a direction that is parallel to the radial direction 215 of the rotor, while a coolant fluid may be passed through the outer shell.

In accordance with at least some embodiments, the one or more through-openings 216 are arranged annularly with respect to the rotor shaft 204. In this way a flow of coolant fluid may be supported to cooling channels that are arranged annularly with respect to the rotor shaft. Provided the cooling channels are also arranged annularly with respect to the rotor shaft 204 the annular arrangement of the through-openings 216 provides that the coolant fluid may enter the cooling channels 212 via the through-openings 216 the shortest way.

In accordance with at least some embodiments, the one or more through-openings 216 are rectangular openings, circular openings and/or openings that are arched with respect to the rotor shaft 204. The shapes of the openings may be selected to support guiding a coolant fluid to the cooling channels.

In accordance with at least some embodiments, the BLDC electric motor comprises sealing structures 218,220 between the stator hub 208 and the outer shell, and the electromagnets 210 are enclosed within a space 230 formed by the outer shell and the stator hub 208 and the sealing structures 218,220. In this way contamination of the electromagnets 210 and the permanent magnets 211 by particles carried by a fluid flow may be prevented.

In accordance with at least some embodiments, the sealing structures 218,220 comprise one or more shaft sealings, one or more non-contact-sealings, for example one or more labyrinth sealings, and/or one or more bearing assemblies. The sealing structures provide that a mechanical friction to a rotational movement of the stator hub and the outer shell is small or the mechanical friction may be prevented. It should be noted that the sealing structures of the BLDC electric motor may comprise different types of sealing structures, for example a non-contact sealing structure, for example a labyrinth seal, and a contact sealing structure, for example a shaft sealing or a bearing assembly.

In accordance with at least some embodiments, the sealing structures 218,220 comprise a first sealing structure 218 and a second sealing structure 220, and the first sealing structure 218 is arranged at first positions, at the stator hub 208 and at the outer shell, radially outwards from the cooling channels 212 and the second sealing structure 220 is arranged at second positions, at the stator hub 208 and at the outer shell, separated in the longitudinal direction 213 of the rotor shaft 204 and/or in a direction that is transverse to the longitudinal direction 213 of the rotor shaft 204 from the first positions. At least some positions of the sealing structures provide that at least one of the sealing structures may be positioned away radially away from the cooling channels, whereby exposure of the sealing structure to particles of the coolant fluid may be reduced. On the other hand at least some positions of the sealing structures provide that the outer shell may cover the electromagnets 210 on opposite sides in the longitudinal direction 213 of the rotor shaft.

In accordance with at least some embodiments, the outer shell comprises an annular part 222 arranged to extend in a direction that is parallel to the longitudinal direction 213 of the rotor shaft 204 for annularly covering at least a part of the stator and at least one of the second positions comprise a position at the annular part 222 of the outer shell. Sealing structure at the annular part provides that exposure of the sealing structure to particles of the coolant fluid may be reduced due to the location of the sealing structure being away from the cooling channels in a radial direction 215 of the rotor.

In accordance with at least some embodiments, the cooling channels 212 extend through the stator hub 208 in the longitudinal direction 213 of the rotor shaft 204. In this way the cooling channels do not need space from around the electromagnets and structure of the BLDC electric motor may be compact.

In accordance with at least some embodiments, wherein the cooling channels 212 have circular cross-sections, rectangular cross-sections and/or arched cross-sections. The cross-sections of the cooling channels provide efficient cooling depending on implementation of the BLDC electric motor.

In accordance with at least some embodiments, the cooling channels 212 are arranged annularly with respect to the rotor shaft 204. In this way efficient heat transfer from the electromagnets 210 into a coolant fluid flowing through the cooling channels may be supported.

In accordance with at least some embodiments, the stator hub 208 comprises mounting positions 224,226 for bearing assemblies and the cooling channels 212 extend between the mounting positions 224,226 and the electromagnets 210. In this way the position of the cooling channels support cooling of the bearing assemblies.

In accordance with at least some embodiments, the BLDC electric motor comprises a heat sink 228 arranged on a surface of the stator hub 208. The heat sink provides additional cooling, which may be needed depending on implementation of the BLDC electric motor.

In accordance with at least some embodiments, the BLDC electric motor comprises a fan arranged at one end of the cooling channels 212. The fan provides controlling movement of the coolant fluid through the cooling channels.

In an example, the outer shell 202 may serve as the fan or a separate fan may be connected to the rotor shaft 204. The one or more through-openings 216 of the outer shell 202 are inclined with respect to at least one of:
  the direction that is parallel to a longitudinal direction 213 of the rotor shaft;
  the direction that is parallel to a radial direction 215 of the rotor; and
  a direction of rotation of the rotor shaft 204.

In this way the through-openings 216 may be shaped for causing a fluid flow through the cooling channels 212, whereby the outer shell 202 may serve as a fan. The cross-sections of the through-openings may be rectangular openings, circular openings and/or openings that are arched with respect to the rotor shaft. In an example, an inclination of a through-opening 216 may be achieved by deflecting a position of one end of the through-opening at one side of the outer shell with respect to a position of an opposite end of the through-opening 216 at the opposite side of the outer shell. Accordingly, the opposite ends of the through-opening may be deflected with respect to each other in at least one of the longitudinal direction 213 of the rotor shaft, the radial direction 215 of the rotor and the direction of rotation of the rotor shaft. In an example, the deflection may be achieved by drilling the though-opening through the outer shell at an inclined angle with respect to at least one of the longitudinal direction 213 of the rotor shaft and the radial direction 215 of the rotor.

Figure 28:
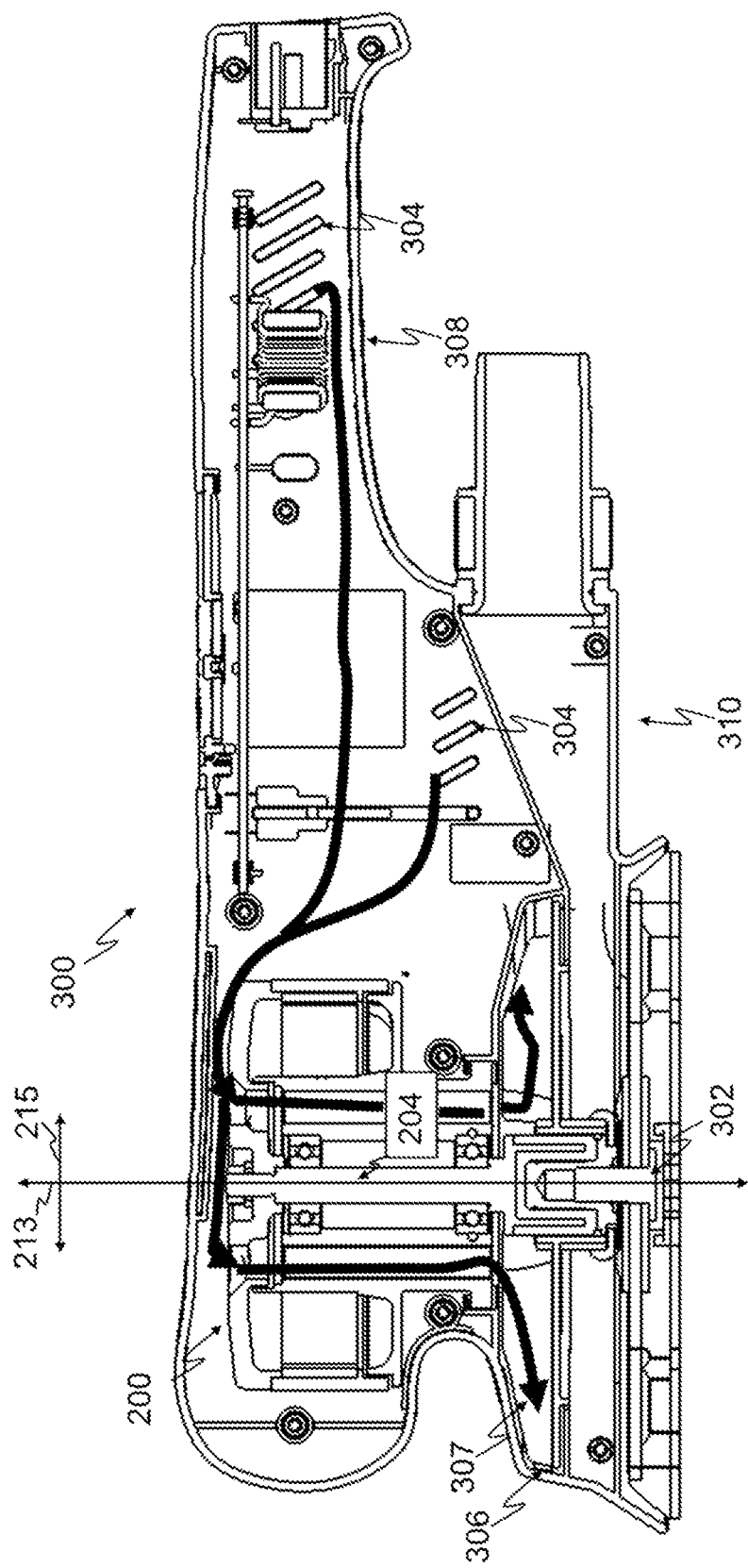
FIG. 28 illustrates a handheld tool in accordance with at least some embodiments.

FIG. 28 illustrates handheld tool comprising rotor shaft assembly in accordance with at least some embodiments. In the following the handheld tool 300 is described with reference to FIG. 28 and the items described with FIG. 27. The handheld tool is illustrated by a cross-section of the handheld tool in a longitudinal direction 213 of a rotor shaft of the BLDC electric motor 200. Accordingly, the handheld tool and the BLDC electric motor therein may be powered by DC electricity. The DC may be obtained from controller that controls switching of DC current, e.g. from an inverter, to the electromagnets 210. The DC fed by the controller to each of the electromagnets may be Pulse Width Modulated (PWM) DC. In this way the controller may control the speed and torque of the rotor shaft 204. The controller may be implemented in software using a microcontroller or microprocessor computer, or may alternatively be implemented using analog or digital circuits.

The handheld tool 300 may comprise openings 304 arranged on a housing of the handheld tool for allowing an air flow to enter the housing for cooling the BLDC electric motor. The air flow may include particles such as dust and debris, and therefore the BLDC electric motor should be protected against the particles such that accumulation of the particles into the BLDC electric motor and overheating caused by the accumulated particles and eventual failures of the BLDC electric motor caused by excess heating could be prevented. In an example, the housing of the handheld tool 300 may comprise openings at one or more surfaces of the housing. The housing may comprise handle portion 308 that may be dimensioned for allowing the handle to be manually gripped by a single hand power grip. The housing may further comprise a body portion 310 that houses the BLDC electric motor. The openings may be provided at both the body portion and the handle portion. Both the handle portion and the body portion may comprise a surface at which one or more openings 304 may be provided for allowing an air flow to enter the housing. Having openings at both the handle portion and body portion support airflow in situations, where one of them is blocked, which may temporarily happen during use of the handheld tool.

The air flow is illustrated by thick arrows in FIG. 28. The air flow enters the housing via the openings 304. Inside the housing, the air flow is guided to the BLDC electric motor 200 and particularly to the through-openings at the outer shell 202. At the BLDC electric motor, the air flow may enter the cooling channels 212 and cool down the BLDC electric motor. The air flow that exits the cooling channels is exhaust air. The exhaust air may be guided to an exhaust outlet 306 for removing the exhaust air from the housing. In this way the air that has warmed up by the BLDC electric motor may be removed and fresh air may be drawn inside the handheld tool for cooling the BLDC motor. The BLDC electric motor may comprise a fan 307 for drawing fresh air into cooling channels and removing the used air out via the exhaust outlet.

In accordance with at least some embodiments, wherein the BLDC motor 200 is configured for driving tools and/or accessories of the handheld tool. Examples of the tools and accessories comprise at least a backing pad, polishing pad, sanding pad, a grinding disc, a drill bit, a screwdriver bit, a chisel and a circular saw blade. In an example, a rotor shaft 204 of the BLDC electric motor may comprise a thread for attaching tools and/or accessories to the rotor shaft 204.

In accordance with at least some embodiments, the handheld tool 300 is a polisher, a sander, a grinder, a screwdriver, an impact driver, a drill, a circular saw, chain saw or jack hammer.

Figure 29:
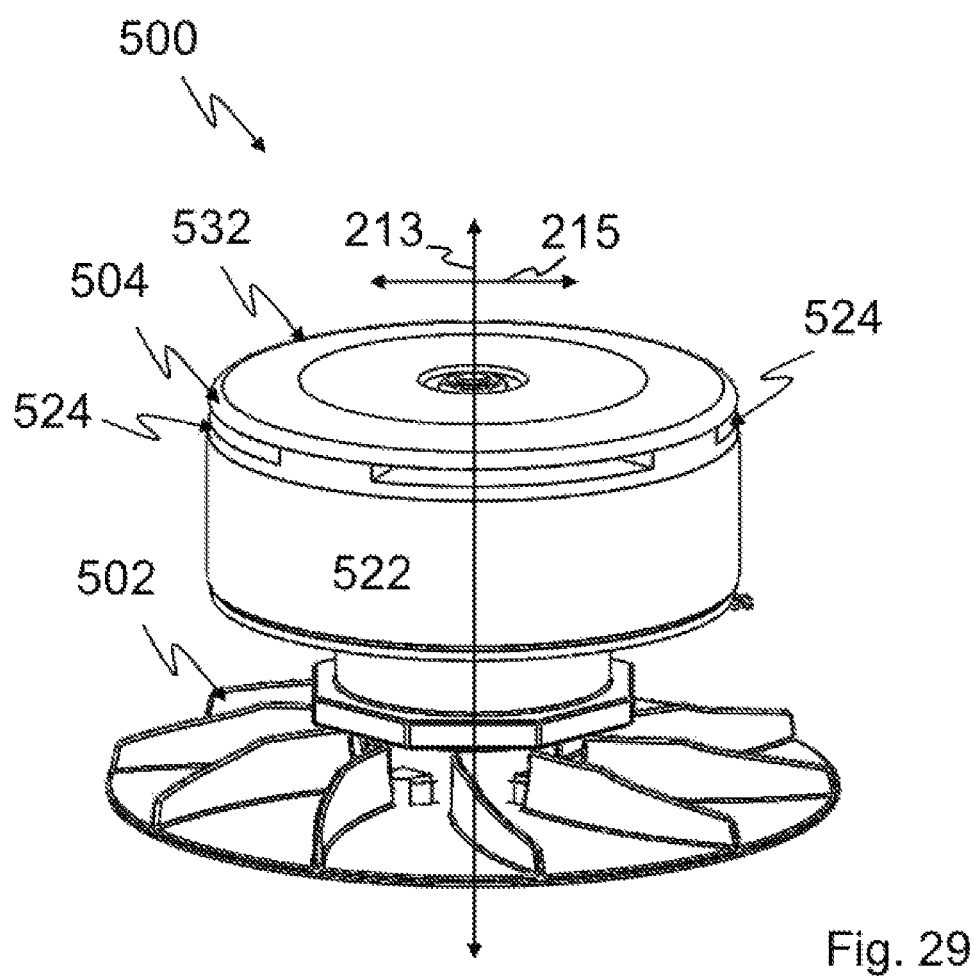
FIG. 29 is a perspective view of an electric motor in accordance with at least some embodiments.
Figure 30:
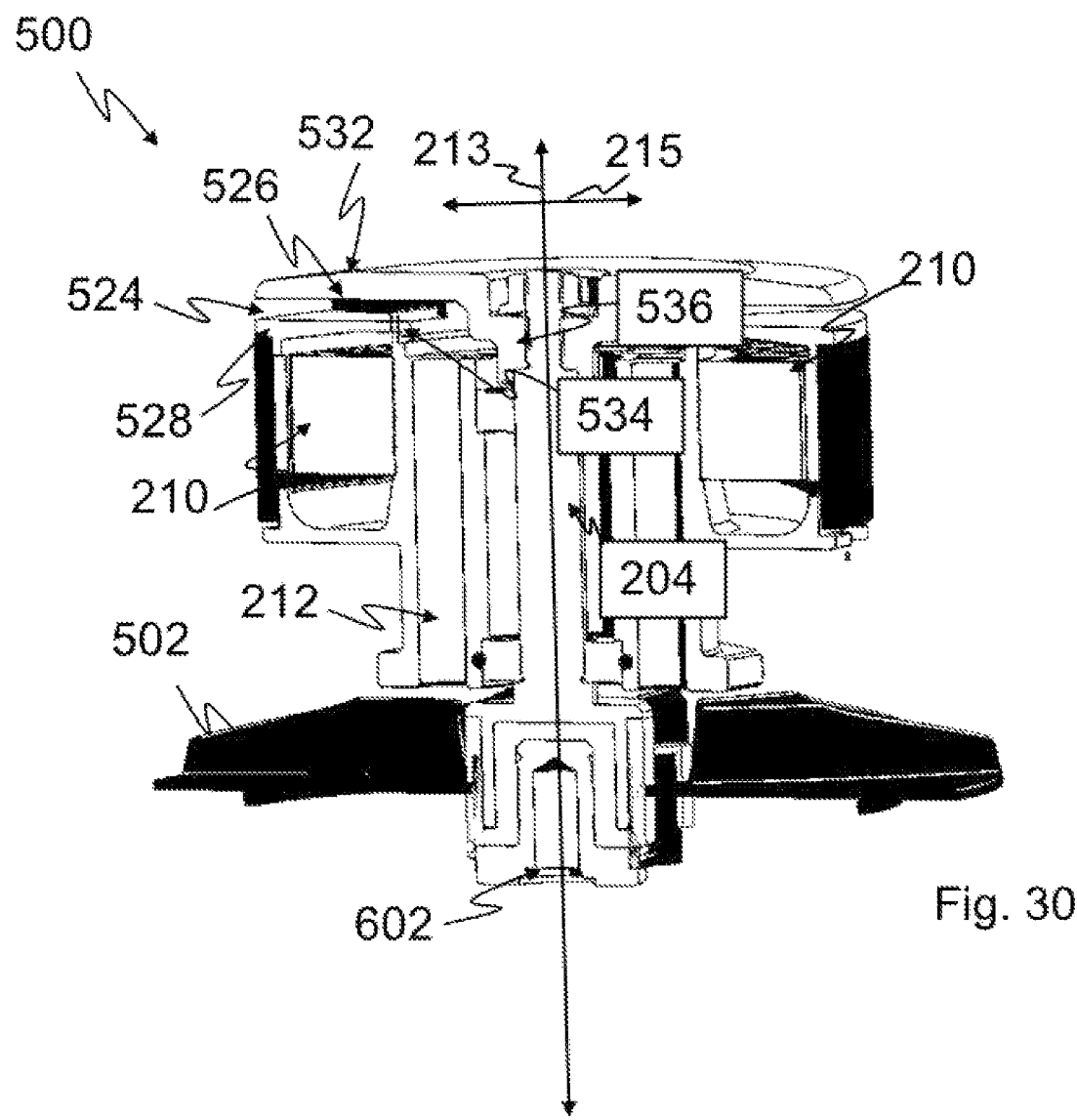
FIG. 30 is a cross-section of an electric motor in a longitudinal direction of a rotor shaft in accordance with at least some embodiments.

FIG. 29 and FIG. 30 illustrate examples for a passage of fluid between surroundings and cooling channels of an electric motor and a fan arranged to control a direction of the fluid via the cooling channels in accordance with at least some embodiments. FIG. 29 is a perspective view of the electric motor 500 and FIG. 30 is a cross-section of the electric motor in a longitudinal direction 213 of a rotor shaft 204 of the electric motor. The electric motor may be at least partly in accordance with the electric motor described with FIG. 27. The electric motor 500 comprises a stator arranged around a rotor shaft 204, an outer shell connected to the rotor shaft 204 and cooling channels 212 positioned between the rotor shaft 204 and electromagnets 210 of the stator.

A passage for fluid may be provided by one or more through-openings 524 arranged to the outer shell in a radial direction 215 of the rotor. In this way a flow of fluid in the radial direction 215 through the outer shell may be provided. More particularly, the through-openings may serve for passages of fluid into the cooling channels 212 inside the outer shell and/or for passages of fluid from the cooling channels 212 out of the outer shell.

In an example, a through-opening 524 may comprise orifices on opposite sides of the outer shell and connected by a passage through the outer shell. One of the orifices may be provided on an outer surface of the outer shell arranged to extend in a direction that is parallel to the longitudinal direction 213 of the rotor shaft, and one of the orifices may be provided on an inner surface of the outer shell, whereby the passage of the through-opening may provide a flow of fluid in the radial direction 215 through the outer shell.

In an example, the passage of the through-opening 524 may be a radial passage inside the outer shell. The radial passage may extend between a stator hub 208 of the stator and a top surface 532 of the outer shell and between a surface of the annular part 522 and the cooling channels 212. The radial passage may have a top wall 526 and a bottom wall 528 that are separated in the longitudinal direction 213 of the rotor shaft. The top wall may be formed by the top surface 532 of the outer shell and the bottom wall may be formed by a radial surface of the outer shell, located below the top surface in the longitudinal direction of the rotor shaft and separated by a distance from the top surface in the longitudinal direction 213 of the rotor shaft. The bottom wall is configured to separate the electromagnets 210 from the fluid flowing inside the radial passage. The top wall may extend in one or more sections between the surface of the annular part 522 and the rotor shaft 204. The bottom wall may extend in one or more sections between the surface of the annular part 522 and the stator hub.

Orifices of the one or more through-openings may comprise annular structures 534, 536 for connecting the radial passages to the stator hub and the rotor shaft. The annular structures 534, 536 may be annular to the rotor shaft and the annular structure 536 may be closer to the rotor shaft in the radial direction 215 than the annular structure 534. In this way the cooling channels may be positioned between the annular structures 534, 536 in the radial direction of the rotor. A sealing structure 218 may connect the annular structure 534 to the stator hub. A connection between the annular structure and the rotor shaft may be an interference fit.

A fan 502 may be arranged at one end of the cooling channels 212 for controlling a direction of fluid flow via the cooling channels. The fan 502 may be located at a bottom end of the cooling channels, below the stator hub 208, in the longitudinal direction 213 of the rotor shaft. The fan may be configured to be rotated by the rotor shaft 204 for producing a pressure difference over the fan in the longitudinal direction 213 of the rotor shaft, and hence force, the fluid flow through the fan and into the cooling channels or out of the cooling channels. Accordingly, in an example the fan 502 may be provided by a rotor shaft assembly, where wherein an electrical insulator is shaped to comprise a fan or to comprise one or more connectors 120 for a fan 118 in accordance with FIG. 21.

In an example, the fan 502 may be connected to the rotor shaft 204 or an output shaft driven by the rotor shaft, whereby the fan may be rotated directly or indirectly by the rotor shaft.

Figure 31:
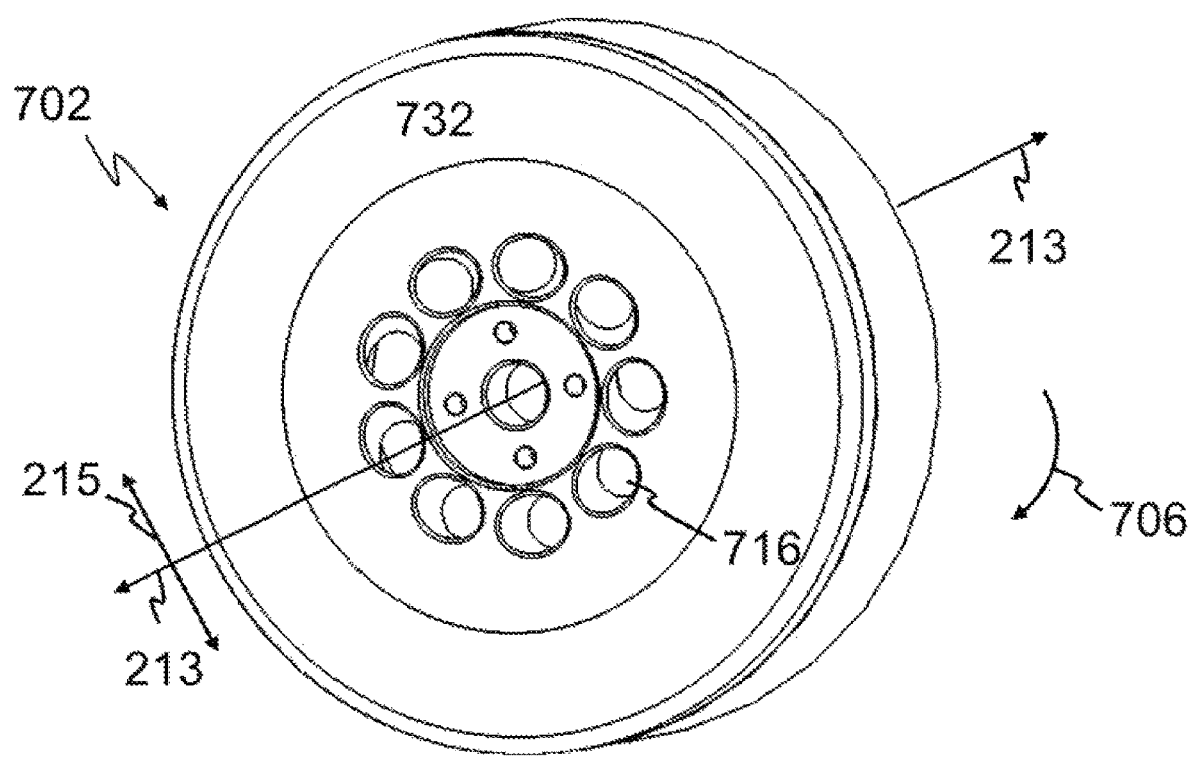
FIG. 31 and FIG. 32 illustrate an outer shell suitable for serving as a fan in accordance with at least some embodiments.
Figure 32:
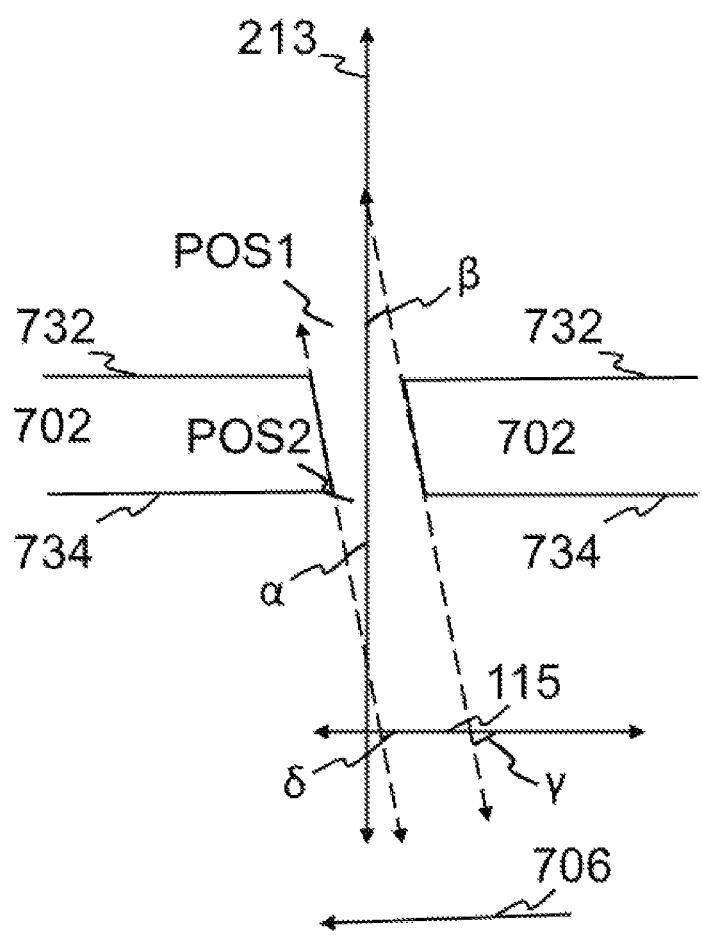

FIG. 31 and FIG. 32 illustrate an outer shell suitable for serving as a fan in accordance with at least some embodiments. FIG. 31 is a perspective view of the outer shell and FIG. 32 is a cross-section of a part of the outer shell. The outer shell 702 may be used in a BLDC electric motor described at least in some embodiments described herein. In the following the outer shell is described with reference to at least some of the items described with FIG. 27.

The outer shell comprises a surface 732, e.g. a top surface or outer surface, that may be connected to a rotor shaft 204. When connected to the rotor shaft 204, the surface 732 may extend at least in the radial direction 215 of the rotor on one side of the electromagnets 210. The outer shell comprises through-openings 716 that are inclined with respect to at least one of:

the direction that is parallel to a longitudinal direction 213 of the rotor shaft;
the direction that is parallel to a radial direction 215 of the rotor; and
a direction 706 of rotation of the rotor shaft 204. In this way the through-openings 716 may be shaped for causing a fluid flow through the cooling channels 212, whereby the outer shell 202 may serve as a fan.

In an example, the inclination of the through-openings 716 causes that positions of opposite ends of the through openings are deflected with respect to each other in the radial direction 215 and/or the longitudinal direction 213. In an example, an inclination of a through-opening 716 may be achieved by deflecting a position of one end of the through-opening at one side of the outer shell, e.g. at the outer surface 732, with respect to a position of an opposite end of the through-opening 716 at the opposite side of the outer shell, e.g. at an inner surface 734 of the outer shell. Accordingly, the through-opening may comprise an orifice at one end at a position "POS1" on the outer surface 732 and the through-opening may comprise another orifice at the other end at a position "POS2" on the inner surface 734 that is on the opposite side of the of the outer shell than the outer surface 732. Examples of the inclination are illustrated by angles α, β, δ and γ at different sides of the through-opening in the direction 706 of rotation of the rotor shaft. The angles α and β are angles with respect to the longitudinal direction 213 and the angles δ and γ are angles with respect to the radial direction 215. It should be noted that the inclination of the through-opening may be defined further with respect to the direction 706 of rotation of the rotor shaft. In an example, angles α and β of the through-opening with respect to the longitudinal direction may be different at different sides of the through-opening in the direction 706 of rotation. Similarly, angles δ and γ of the through-opening with respect to the radial direction may be different at different sides of the through-opening in the direction 706 of rotation.

It should be note that in the foregoing any direction in a radial direction may be a direction that is parallel to the radial direction and or any direction in a longitudinal direction may be a direction that is parallel to the longitudinal direction. A direction that is parallel with the radial direction or the longitudinal direction may be determined on the basis of a comparison of the direction with the radial direction or the longitudinal direction. In an example, the direction may be evaluated to determine whether the direction is parallel with the radial direction or the longitudinal direction. The direction may be divided into components of a coordinate system, such as a cartesian coordinate system spanned in X, Y and Z-dimension, whereby one of the X, Y and Z-dimensions may be aligned with the radial direction or the longitudinal direction. Then a length of the components of the evaluated direction may be compared with each other and if the component with the highest value is in the direction of the dimension that is aligned with the radial direction or the longitudinal direction, the direction may be determined to be parallel with the radial direction or the longitudinal direction. In a simple example, if an evaluated direction has only a component in the X-direction, that is aligned with the radial direction, the evaluated direction may be determined to be parallel with the radial direction. In another example, if an evaluated direction has X, Y and Z-components such that the X-component has the highest value, X>Y>Z, then if the X-direction is aligned with the radial direction, the evaluated direction may be determined to be parallel with the radial direction.

FIG. 33 illustrates an example of a method in accordance with at least some embodiments. The rotor shaft assembly may be in accordance to described with various examples described herein.

Phase 2902 comprises shaping a billet part for a rotor axis to comprise at least one section configured to extend in an axial direction of the rotor shaft outside of a stator assembly of the electric motor, when the rotor shaft is rotatably mounted inside the stator assembly. Examples of shaping comprise at least rotary cutting and casting. Examples of materials of the billet part comprise ferromagnetic materials, or other steel alloys containing e.g. chromium, zinc, manganese, molybdenum, and alloys thereof, such as 42CrMo4.

Phase 2904 comprises connecting an electrical insulator to the at least one section, wherein the electrical insulator is configured to connect to an output shaft for connecting with a tool and/or accessory, or configured to connect directly to a tool and/or accessory to be driven by the electric motor. Examples of the connecting comprise at least connecting by injection molding, 3D-printing and manually fitting electrical insulator to the at least one section. Since electrical insulation is connected to the at least one section, the electrical insulator is outside of the stator assembly and its presence, condition and conformance against applicable safety requirements may be easily verified.

In an example, phase 2904 comprises connecting the electrical insulator by injection molding the electrical insulator to the at least one section from electrically insulating material. In this way the manufacturing of the electrical insulator and connecting the electrical insulator may be combined. Accordingly, when the electrical insulator has been injection molded to the at least one section, the electrical insulator is also connected to the at least one section and the electrical insulator forms a part of the rotor shaft assembly. The at least one section may comprise an axial cavity 128, whereby the electrically insulating material may be injection molded inside the axial cavity, over the axial cavity or inside and over the axial cavity.

In an example, phase 2904 comprises at least automatically or manually fitting a 3D-printed electrical insulator to the at least one section.

In accordance with at least some embodiments, phase 2902 comprises shaping the at least one section to comprise at least one of an axial cavity 128 and a roughened surface 126,127. The shaping may be performed by mechanically processing the ferromagnetic material, e.g. by rotary cutting, honing, knurling, broaching or hobbing.

In accordance with at least some embodiments, phase 2904 comprises shaping the electrical insulator to comprise a first cavity for a nested connection with the at least one section; and connecting the electrical insulator to the at least one section 106b by an interference fit. In an example, the at least one section has a roughened surface 126 that is inserted inside the first cavity. The first cavity may be an axial cavity provided on the electrical insulator.

In accordance with at least some embodiments, phase 2904 comprises shaping the electrical insulator to comprise a second cavity 127, and connecting the output shaft to the second cavity 127 of the electrical insulator by an interference fit.

In accordance with at least some embodiments, phase 2904 comprises injection molding the electrical insulator to the at least one section from electrically insulating material or 3D-printing the electrical insulator from electrically insulating material. The injection molding and 3D-printing may be used for shaping the electrical insulator or parts of the electrical insulator.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An electric motor comprising:
   a stator assembly; and
   a rotor comprising a rotor shaft assembly rotatably mounted inside the stator assembly;
   wherein said rotor shaft assembly comprising:
   i. at least one section that is configured to extend in an axial direction of the rotor shaft assembly outside of the stator assembly of the electric motor, when the rotor shaft assembly is rotatably mounted inside the stator assembly, and
   ii. an electrical insulator connected to the at least one section and the electrical insulator is configured to connect to an output shaft for connecting with a tool and/or accessory, or configured to connect directly to a tool and/or accessory to be driven by the electric motor; and
   wherein said stator assembly comprises a stator hub comprising electromagnets, and the stator hub comprises cooling channels extending in a direction that is parallel to a longitudinal direction of the rotor shaft assembly and the cooling channels are positioned between the rotor shaft assembly and the electromagnets.

2. The electric motor according to claim 1, wherein the electric motor is an in-runner motor or an out-runner motor.

3. The electric motor according to claim 1, further comprising a fan arranged at one end of the cooling channels.

4. The electric motor according to claim 1, wherein the electrical insulator comprises at least one first portion for connecting with the at least one section and at least one second portion configured to connect with the output shaft, or configured to connect directly with a tool and/or accessory to be driven by the electric motor.

5. The electric motor according to claim 4, wherein the output shaft comprises a roughened surface for connecting with the electrical insulator and the at least one second portion comprises a cavity for an interference fit between the cavity and the output shaft that is at least partially received within the cavity.

6. The electric motor according to claim 5, wherein the output shaft comprises an inside thread or an outside thread for connecting to the tool and/or accessory.

7. The electric motor according to claim 4, wherein said at least one second portion comprises an inside thread or an outside thread for connecting to the tool and/or accessory.

8. The electric motor according to claim 1, wherein the at least one section comprises a roughened surface for transferring torque to the electrical insulator connected to the at least one section.

9. The electric motor according to claim 1, wherein the electrical insulator comprises an axial cavity for a nested connection with the at least one section.

10. The electric motor according to claim 1, wherein the at least one section comprises an axial cavity for a nested connection with the electrical insulator connected to the at least one section.

11. The electric motor according to claim 10, wherein the axial cavity comprises one or more walls extending in the axial direction of the rotor shaft assembly and the one or more walls comprise one or more through-holes.

12. The electric motor according to claim 11, wherein the one or more walls comprise more than one through-hole arranged on the one or more walls at different radial and/or axial positions.

13. The electric motor according to claim 1, wherein the electrical insulator is shaped to comprise a fan or to comprise one or more connectors for a fan.

14. The electric motor according to claim 1, wherein the electrical insulator is connected to the at least one section by injection molding the electrical insulator from electrically insulating material or the electrical insulator is configured to connect to the at least one section by 3D-printing the electrical insulator from electrically insulating material.

15. A handheld tool comprising an electric motor comprising:
   a stator assembly; and
   a rotor comprising a rotor shaft assembly rotatably mounted inside the stator assembly;
   wherein said rotor shaft assembly comprising:

i. at least one section that is configured to extend in an axial direction of the rotor shaft assembly outside of the stator assembly of the electric motor, when the rotor shaft assembly is rotatably mounted inside the stator assembly, and
ii. an electrical insulator connected to the at least one section and the electrical insulator is configured to connect to an output shaft for connecting with a tool and/or accessory, or configured to connect directly to a tool and/or accessory to be driven by the electric motor; and wherein said stator assembly comprises a stator hub comprising electromagnets, and the stator hub comprises cooling channels extending in a direction that is parallel to a longitudinal direction of the rotor shaft assembly and the cooling channels are positioned between the rotor shaft assembly and the electromagnets.

16. The handheld tool according to claim 15, wherein the handheld tool is a polisher, a sander, a grinder, a screwdriver, an impact driver, a drill, a circular saw, a chain saw or a jack hammer.

* * * * *